Dec. 26, 1961 A. H. DICKINSON 3,014,659
ELECTRONIC INTEGRATING MEANS FOR CONTINUOUS VARIABLE QUANTITIES
Filed Nov. 27, 1953
5 Sheets-Sheet 1

INVENTOR.
ARTHUR H. DICKINSON
BY
HIS ATTORNEYS.

Dec. 26, 1961 A. H. DICKINSON 3,014,659
ELECTRONIC INTEGRATING MEANS FOR CONTINUOUS VARIABLE QUANTITIES
Filed Nov. 27, 1953 5 Sheets-Sheet 2
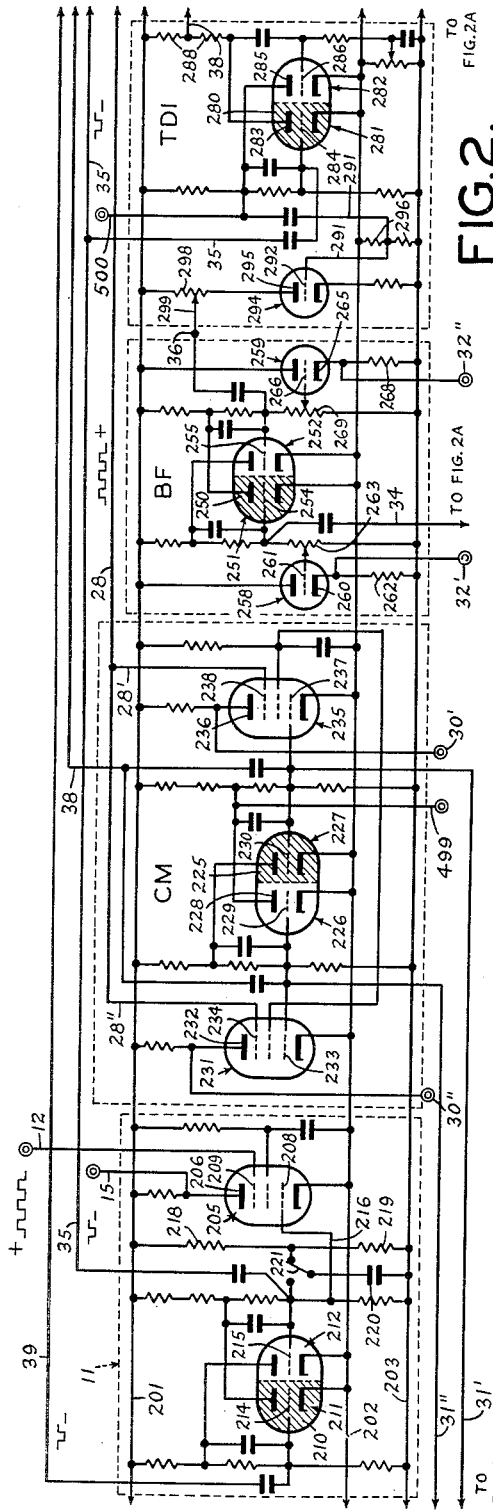
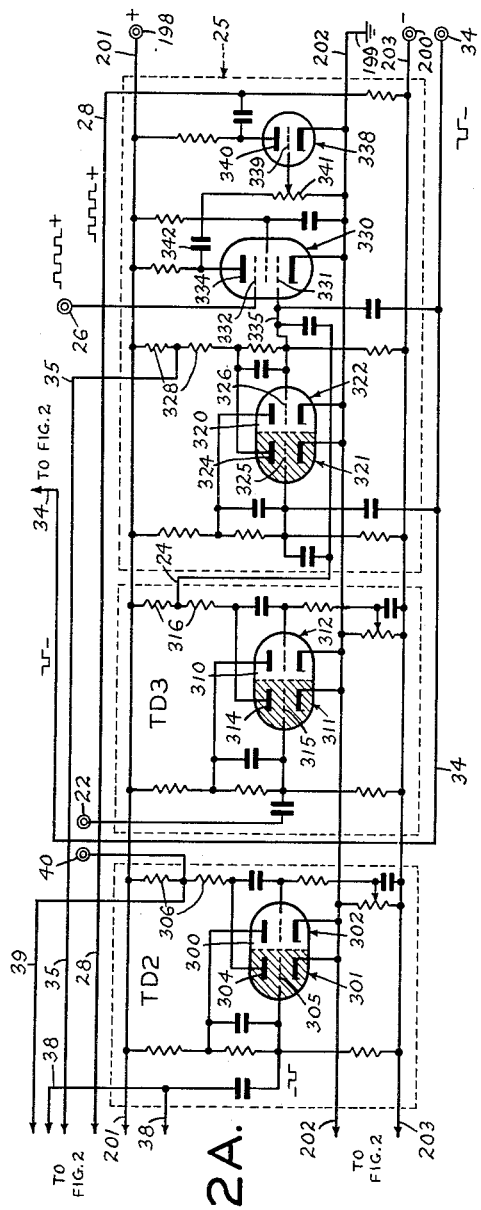
INVENTOR.
ARTHUR H. DICKINSON
BY
Campbell, Brumbaugh, Free & Graves
HIS ATTORNEYS.

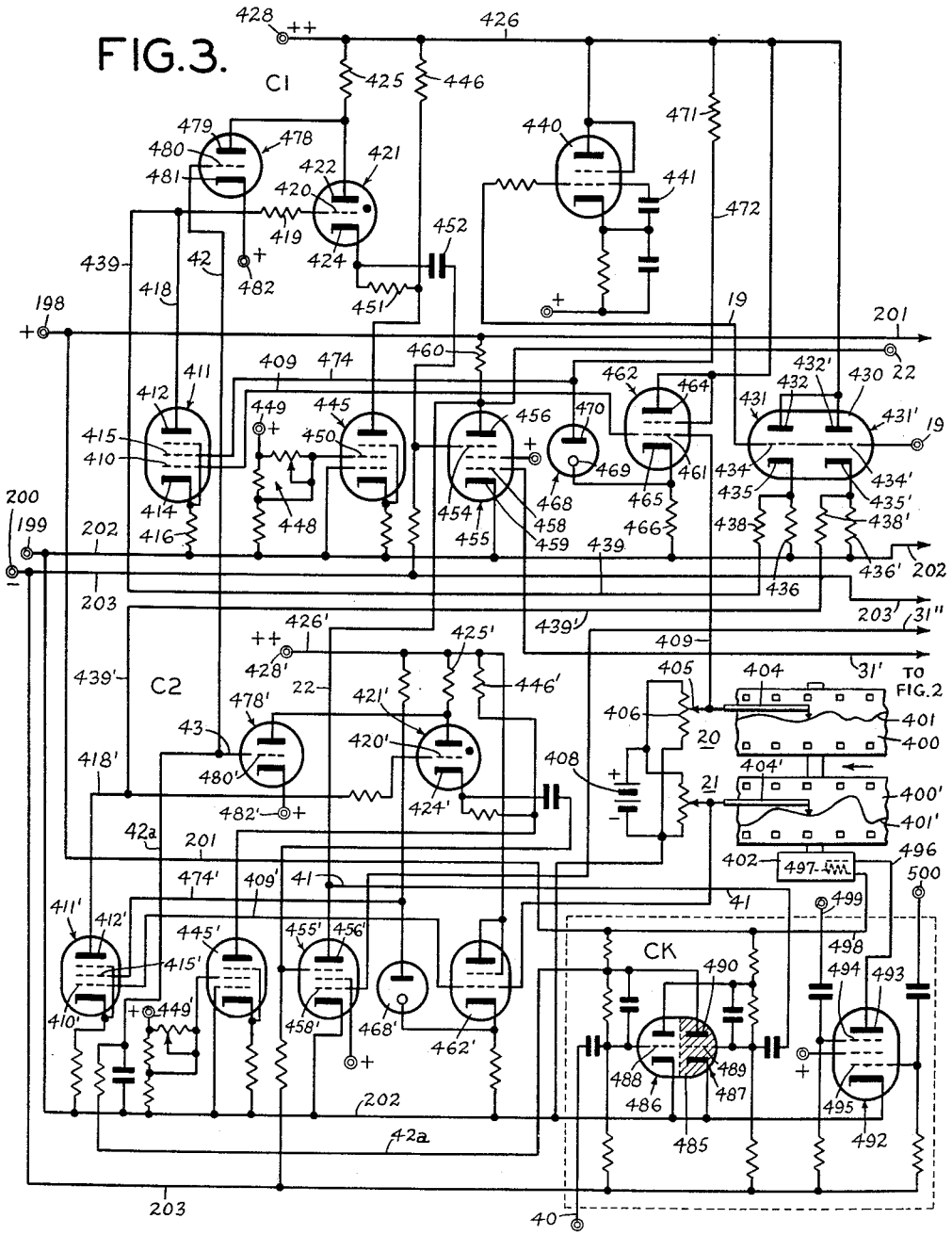

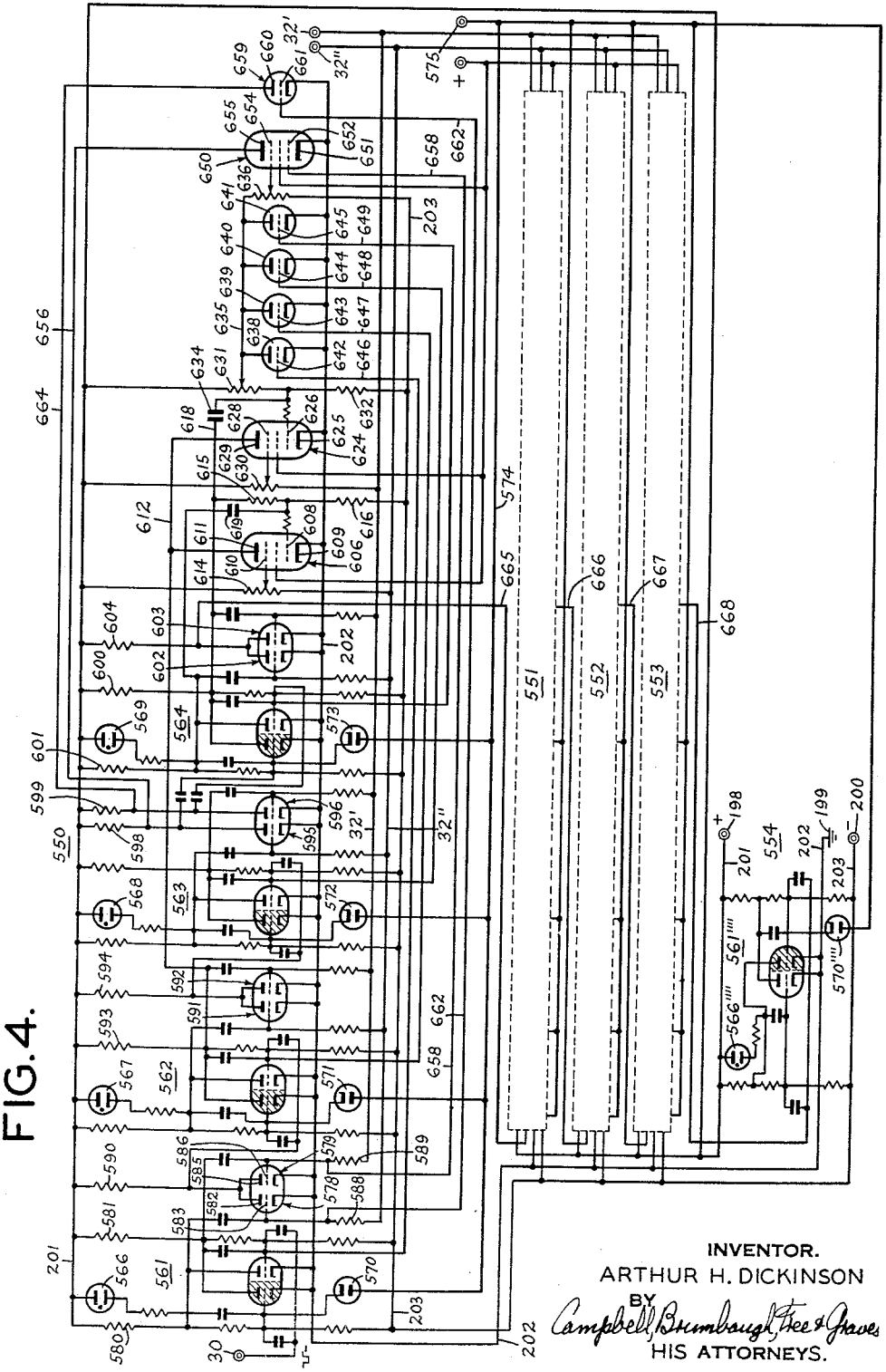

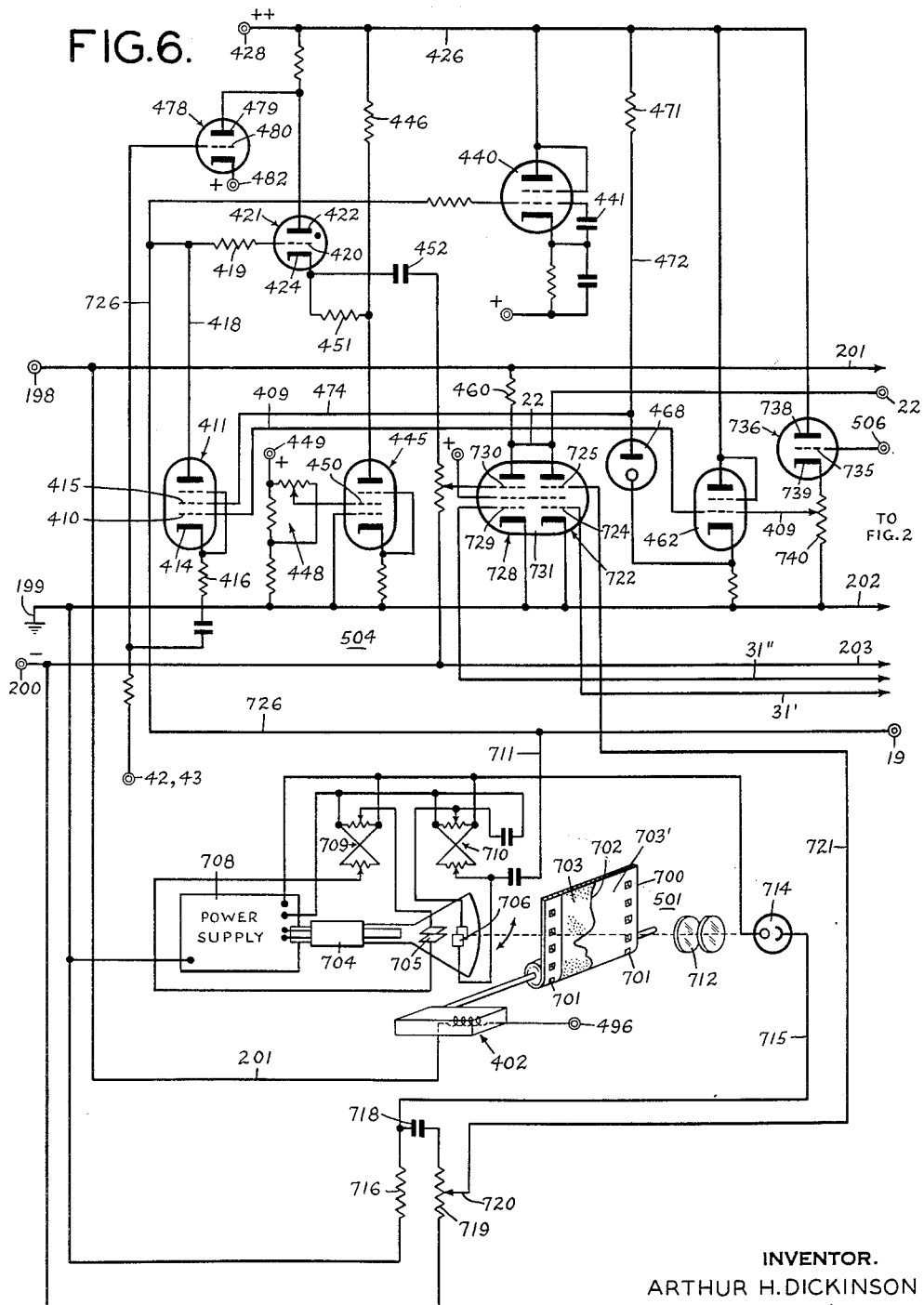

United States Patent Office 3,014,659
Patented Dec. 26, 1961

3,014,659
ELECTRONIC INTEGRATING MEANS FOR CONTINUOUS VARIABLE QUANTITIES
Arthur H. Dickinson, Greenwich, Conn., assignor to International Business Machines Corporation, New York, N.Y., a corporation of New York
Filed Nov. 27, 1953, Ser. No. 394,540
17 Claims. (Cl. 235—152)

The present invention relates to electronic measuring and indicating systems and, more particularly, to novel and improved apparatuses for measuring and indicating the instantaneous values of continuous varying phenomena, for integrating these values, and for manifesting the results of this integration in digital form.

Various types of electronic and electromechanical calculators and computers are currently being used for measuring and indicating the value of a variable quantity such as an electrical potential or a physical displacement. Such a type of electronic measuring and recording device is disclosed in a copending U.S. application Serial No. 270,411, filed February 7, 1952, by A. H. Dickinson, now Patent No. 2,872,670, and in United States Patents Nos. 2,700,750 and 2,717,994. The system therein disclosed operates by comparing a physical displacement or an electrical potential proportional to the variable quantity being measured to an incrementally increasing reference quantity and providing a digital manifestation of the value of the reference quantity when it is found to be equivalent to the magnitude of the variable quantity.

The incrementally increasing reference quantity is derived from an electronic circuit wherein pulses of a predetermined repetition frequency are fed through an electronic gating means into an electrical pulse counting device. A translator means converts the instantaneous setting of the counting device into a reference potential having an amplitude proportional to the instantaneous setting of the pulse counting device. This amplitude is continuously compared to a signal representative of the variable quantity. When the reference signal reaches an amplitude equivalent to the value of the variable quantity, the gating circuit is closed and the counter circuit provides a digital manifestation of the amplitude of the reference signal. This type of a system has been found to be very accurate, sensitive and reliable. However, there is no provision in such a system for integrating instantaneous values of a variable quantity.

It is an object of the invention, accordingly to provide novel and improved measuring and recording apparatuses of the aforementioned type wherein the instantaneous values of the variable quantity are integrated and a digital manifestation of the results of this integration is made.

Another object of the invention is to provide novel and improved apparatuses for performing more than one order of integration of continuous variable phenomena.

In accordance with the invention, electrical pulses having a predetermined repetition frequency may be generated by an electronic pulse generator and fed by means of a primary gating means to a register means such as an electronic pulse counting circuit. The instantaneous setting of the electronic counting circuit may be translated into a reference signal of incrementally increasing magnitude. This reference signal may be continuously compared to an instantaneous sample of a variable quantity. When the reference signal reaches a magnitude equal to or in some predetermined proportion to the instantaneous sample, the comparator operates to close the primary gating means, thereby preventing any further entries on the counting circuit. A value may then be manifested digitally by the counter that is either equal to, or proportional to, the instantaneous value of the variable quantity. After a short period of manifestation, a feeding mechanism may supply the next incremental portion of the continuous variable quantity to the comparator and another cycle of measuring and indicating is initiated.

An entry may be made for each one of these measuring and indicating cycles into a summation counter, wherein the results of the individual measuring and indicating cycles are integrated during a complete integrating cycle. This summation counter is not reset until the complete integrating operation has been performed.

The preferred form of summation counter is electronic and is capable of operating either forwardly or backwardly. When the continuous varying phenomena are negative, the summation counter operates backwardly and, when the phenomena are positive, the counter operates forwardly. For example, the summation counter may operate forwardly through a positive range of say 0000 to +9999 or backwardly through a negative range from 0000 to −9999. In order to accomplish this, the register means must count over a range equivalent to both the positive and negative ranges of the summation counter, i.e., a range from 00000 to 19999. As the register means commences counting from 00000, its value incrementally increases towards 10000 and the translator provides a step-by-step increasing reference potential. If this potential in conjunction with the potential of the instantaneous value of the variable quantity causes the operation of the comparator before the register means reaches 10000, a secondary gate opens and permits pulses to operate the summation counter backwardly, until the register means reaches 10000 (at which point the counting operations cease).

On the other hand, if the comparator does not operate before the register means reaches 10000, then, at such count, the secondary gate for the summation counter opens and electrical pulses from the pulse generator cause the summation counter to operate forwardly. This action continues until the translator reference potential and the potential of the variable quantity cause the operation of the comparator, suspending further counting at a value equivalent or proportional to the variable quantity being sampled.

While the register means is reset at the end of every measuring and indicating cycle, the summation counter, as previously mentioned, is not reset until a complete integration has been effected. It is seen, therefore, that once each measuring cycle the summation counter receives a count, which is added to the algebraic sum of all the previous counts.

A further embodiment of the invention provides a system wherein the second order of integration of a variable quantity can be achieved. This second order of integration is accomplished in a manner similar to the above-described first order of integration of the variable quantity, with the exception that the entries on the first summation counter at the end of each individual measuring and indicating cycle for the instantaneous values of the variable quantity are fed into a second summation counter, which provides a digital manifestation of the second order of integration of the variable quantity.

For a more complete understanding of the invention, reference may be had to the following detailed description of the various embodiments of the invention taken in conjunction with the accompanying figures of the drawing, in which:

FIGS. 2 and 2a are circuit diagrams of the electronic equipment included within the dashed line 2 of FIG. 1;

FIG. 3 is an electrical circuit diagram of the equipment included within the dashed line 3 of FIG. 1;

FIG. 4 is an electrical circuit diagram of either of the summation counters S1 or S2 shown in the block diagram in FIG. 1;

FIG. 6 is an electrical circuit diagram of the comparator shown in FIG. 5.

Figure 1:
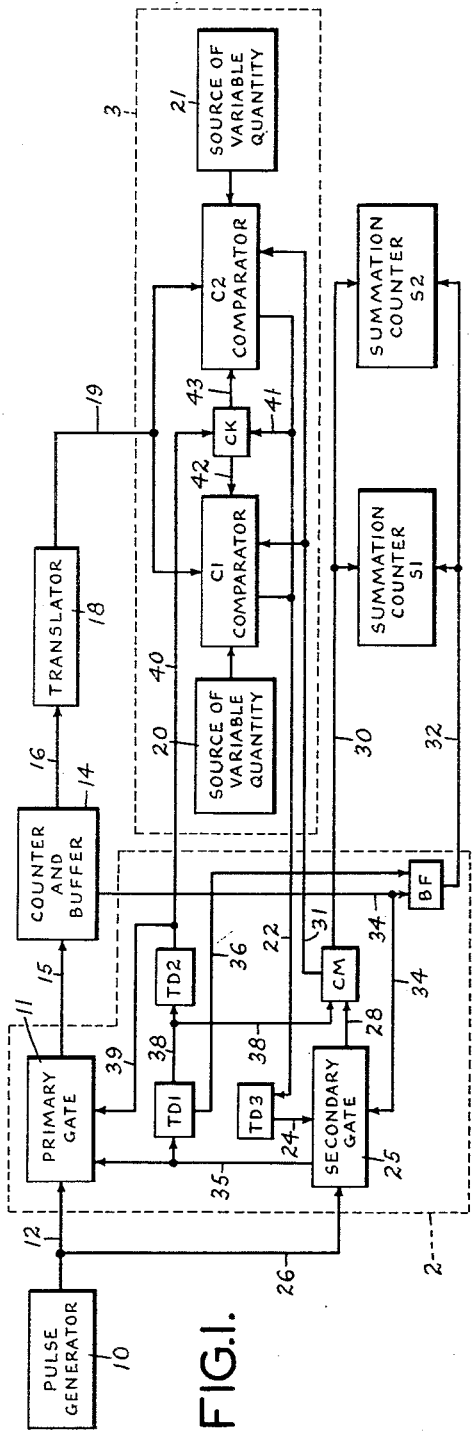
FIG. 1 is a schematic block diagram of an integrating system in accordance with the invention.

Integrating system of FIG. 1

Referring now to FIG. 1, a pulse generator 10 supplies pulses having a predetermined repetition frequency to a primary gating circuit 11 through a conductor 12. The output of the primary gating circuit 11 may be connected by a conductor 15 to a register means, for example, a counter and buffer circuit 14 which in turn may be connected by a conductor 16 to a translator unit 18. The output potential of the translator 18 may then be fed to two comparators C1 and C2 by means of a conductor 19.

The pulse generator 10, the counter and buffer circuits 14, and the translator 18 may take the form of the similar circuit components described in the aforementioned copending application Serial No. 270,411.

Each of the comparators C1 and C2 may have separate sources 20 and 21, respectively, of signals representative of variable quantities connected to them. The outputs of the comparators C1 and C2 may be connected through a conductor 22, a time delay device TD3 and a conductor 24 to a secondary gate circuit 25.

The input to the secondary gate circuit 25 may be connected to the pulse generator 10 through a conductor 26, while the output of the secondary gate 25 may be alternately connected to the summation counters S1 and S2 through conductor means 28, a switching means CM and conductor means 30.

The switching means CM may be arranged to alternately enable the comparators C1 and C2 through conductor means 31.

The direction of operation of the summation counters S1 and S2 may be controlled by a switching means BF through a conductor 32. The switching means BF may in turn be controlled by a control potential from the counter and buffer circuits 14 through the conductor 34, which also serves to deliver a control potential from the counter and buffer circuit 14 to the secondary gate circuit 25.

A conductor 35 may serve to supply a control potential from the secondary gate circuit 25 to the primary gate circuit 11. This control potential from the secondary gate circuit 25 may also be supplied through the conductor 35 to a time delay device TD1. The time delay device TD1 may supply a first control potential to the switching means BF through a conductor 36 and a second control potential to a time delay device TD2 and the switching means CM through a conductor 38. The time delay device TD2 may supply a control potential to the primary gate circuit 11 via a conductor 39 and to a switching means CK via a conductor 40. The switching means CK may further be controlled by a control potential from the comparators C1 and C2 via a conductor 41. The switching means CK may then be arranged to supply control potentials to the comparator circuits C1 and C2 via the conductors 42 and 43, respectively.

Operation of the system of FIG. 1

The variable quantity sources 20 and 21 supply variable electrical potentials or physical displacements to their respective comparators C1 and C2. These electrical potentials or physical displacements may be representative of any continuous variable quantity, the instantaneous values of which are to be integrated. The comparators C1 and C2 operate in an alternate manner as will be seen from the following discussion.

During each cycle of operation of the comparators C1 and C2, an incremental instantaneous sample of the variable quantity is compared to a reference signal which is derived from the translator 18. It will be understood by those skilled in the art that these incremental instantaneous samples must be taken at equal intervals along either a time axis or a displacement axis normal to the amplitude displacements of the instantaneous incremental values, so that the count manifested by the summation counters S1 and S2 will be representative of the integration of the instantaneous values over the total period.

The pulse generator 10 serves to generate electrical pulses at a predetermined repetition frequency. The primary gate circuit 11 is manually enabled at the start of a complete integration cycle so as to initially pass the electrical pulse output of the pulse generator 10 to the counter and buffer circuits 14.

As discussed in detail, for example, in the aforementioned patents and copending application Serial No. 270,411, the register means or counter circuit 14 may comprise a plurality of banks of series connected double-stability trigger circuits. Each of the banks of trigger circuits corresponds to a different denominational order of magnitude. For example, five banks of trigger circuits may be utilized, corresponding to the denominational orders of units, tens, hundreds, thousands, and ten thousands. In the preferred embodiment, only one trigger circuit is used in the ten thousand order. Thus a counting range of 00000 to 19999 is provided by the counter or register means 14.

As further described in the aforementioned patents and application Serial No. 270,411, a signal representative of the stability position of each of the trigger circuits in the counter or register means 14 is supplied through a buffer unit to the translator 18. The buffer unit functions to maintain the individual control signals from the trigger circuits at uniform levels in order to secure dependability in the operation of the system. However, under some circumstances it may be found that satisfactory results can be achieved without the utilization of a buffer unit intermediate the counter circuit or register means 14 and the translator unit 18.

Still further, as disclosed in the aforementioned patents and application Serial No. 270,411, the translator unit 18 converts the instantaneous settings or counts of the counter circuit or register means 14 into a reference potential having an amplitude equivalent, or proportional, to the instantaneous settings of the counter circuit 14. Thus the reference signal created by the translator unit 18 is an incrementally increasing electrical potential, wherein each of the incremental increases in the potential of the reference signal correspond to the discrete electrical pulses being fed from the pulse generator 10 through the primary gate circuit 11 to the counter circuit or register means 14.

Since the instantaneous samples of the variable quantities may be either positive or negative, it is necessary to select a reference point in the range of the counter circuit or register means 14 as a zero value. In the preferred embodiment, this value is selected as 10000. Therefore, a negative range from 00000 to 10000 and a positive range from 10000 to 19999 is provided. Accordingly, it is necessary to arrange the comparator circuits C1 and C2 so that the zero values of the variable quantities supplied by the sources 20 and 21 will coincide with the zero value of the reference signal supplied by the translator unit 18.

At the initiation of the complete integrating cycles for the summation counters S1 and S2, and the comparators C1 and C2, the secondary gate circuit 25 is closed, the switching circuit CM is conditioned so as to enable the comparator C1, in preference to the comparator C2, and the summation counter S1, in preference to the summation counter S2, and the switching circuit BF is conditioned so that both the summation counters S1 and S2 will operate backwardly.

Therefore, when the complete integrating cycle is initiated the primary gating circuit 11 starts to pass electrical pulses from the pulse generator 10 to the counter circuit 14 and the instantaneous settings of the counter circuit 14 are converted by the translator unit 18 into a reference signal. The amplitude of the reference signal is then continuously compared to the instantaneous sample of the variable quantity by the comparator C1.

If the value of the instantaneous sample of the continuous variable quantity is negative, the comparator C1 will open the secondary gate circuit 25 through the time delay device TD3 before the reference signal reaches its zero value, corresponding to the count 10000 on the counter circuit or register means 14, and switch the switching device CK to an alternate condition whereby it discharges the comparators C1 and C2. The opening of the secondary gate circuit 25 permits electrical pulses from the pulse generator 10 to pass through it to the switching circuit CM. As aforementioned, the switching circuit CM is initially conditioned so that the summation counter S1 is enabled in preference to the summation counter S2. Thus the electrical pulses passing through the secondary gate 25 are directed to the summation counter S1. Further, since the switching circuit BF has initially conditioned the summation counter S1 to operate in a backwardly direction, the electrical pulses are negatively counted on the summation counter.

This counting operation of the summation counter S1 continues until the counter circuit or register means 14 reaches its mid-point 10000, which is equivalent to the zero value of the reference signal. The ten thousand count for the counter circuit 14 will occasion a change in the stability condition of the single trigger circuit in the ten thousand order bank. This change in the stability condition produces a control potential or pulse which passes through the conductor 34 to close the secondary gate circuit 25. This pulse also serves to switch the switching circuit BF to condition the summation counters S1 and S2 to operate in a forwardly direction. The reason for this last mentioned operation will become apparent in the following discussion relating to positive quantities.

If, on the other hand, the value of the instantaneous sample of the continuous variable quantity is positive, the comparator C1 will not operate until after the counter circuit or register means 14 exceeds a count of 10000. However, when the count of 10000 is reached by the counter circuit 14, certain changes must be effected in the system to enable it to count forwardly. These changes are effected by the control pulse produced by the change in the stability condition of the single trigger circuit in the ten thousand order bank.

Since the secondary gate circuit 25 has not been previously opened in this measuring cycle, the control pulse from the counter circuit 14 passes over the conductor 34 and opens the secondary gate circuit 25. This control pulse also serves, as previously mentioned, to switch the switching device BF to condition the summation counters S1 and S2 to operate in a forwardly direction.

When the secondary gate circuit 25 is opened, electrical pulses from the pulse generator 10 are passed through the conductor 26, the secondary gate circuit 25, the conductor 28, the switching means CM, the conductor 30 to the summation counter S1, which is operating in a forwardly direction. Thus the counter circuit 14 and the summation counter S1 are each counting in a forwardly or additive direction.

When the reference signal from the translator unit 18 reaches a value corresponding to the value of the instantaneous sample of the continuous variable quantity, the comparator C1 operates and closes the secondary gate circuit 25 through the time delay device TD3. The comparator C1 also switches the switching device CK to an alternate condition whereby it discharges the comparators C1 and C2.

When the secondary gate circuit 25 is closed by the control potential from the counter circuit 14 or from the comparator C1, a control signal is sent via the conductor 35 from the secondary gate circuit 25 to disable or close the primary gate circuit 11. This control signal is also fed to the time delay device TD1.

Since the switching circuit BF must be returned to its original condition so as to condition the summation counters S1 and S2 to operate backwardly at the start of the next individual measuring cycle, a control potential or pulse is fed from the time delay device TD1 through the conductor 36 to the BF switching device.

A second control signal is also derived by the time delay device TD1 and is transmitted through the conductor 38 to initiate the operation of the time delay device TD2 and to switch the switching device CM. The output of the time delay device TD2 is fed through the conductor 39 to the primary gate circuit 11 to initiate the next individual measuring cycle. At the same time, the output control potential from the time delay device TD2 is fed over the conductor 40 to the switching circuit CK to return it to its initial position, thereby enabling the comparator circuits C1 and C2 via the conductors 42 and 43.

The control signal on the conductor 38 from the time delay device TD1 causes the switching means CM to switch its position so as to enable the comparator circuit C2 and the summation counter S2 in preference to the comparator circuit C1 and the summation counter S1.

Thus the circuit elements of the system are prepared for the next individual measuring cycle, which is initiated by the control signal over the conductor 39 to the primary gate circuit 11. At the end of this next individual cycle, in which an instantaneous sample of the variable quantity from the source 21 is compared in the comparator circuit C2 and the value recorded in the summation counter S2, the control signal from the time delay device TD1 again returns the switching device BF to its initial position in preparation for another individual measuring cycle. This control signal also reverses the switching means CM so as to enable the comparator C1 and the summation counter S1 in preference to the comparator C2 and the summation counter S2.

The control signal from the time delay device TD2 then completes the enabling of the comparator C1 through the switching circuit CK and the conductor 42. It further initiates the next individual measuring cycle by opening or enabling the primary gate circuit 11 by a control signal over the conductor 39.

At the end of the second individual measuring cycle and all other even-numbered individual measuring cycles, the switching means CK will also function to vary the feed of the variable quantities from the sources 20 and 21 to the comparators C1 and C2 so that the next incremental instantaneous values of the variable quantities will be sampled during the next odd and even cycles, respectively.

Thus it is apparent that the system of FIG. 1 provides an apparatus whereby the instantaneous values of two different variable quantities may be integrated in the alternate measuring cycles of the device.

Let us now consider the detailed circuits for preferred embodiments of the various system components shown in FIG. 1 which are not described in detail in the aforementioned copending application. As an aid in understanding the operation of the system, the triode section of each of the trigger circuits in FIGS. 2, 2a, 3 and 4, which is initially conductive at the start of the overall integrating cycle, is shaded. Further, typical waveforms representative of signals to be carried over certain of the conductors have been placed adjacent to these conductors.

The electronic circuits in FIGS. 2, 2a, 3, 4 and 6 are energized from a plate supply bus 201 connected to a suitable source 198 of positive plate potential, a bus 202 connected to a ground 199 or other suitable reference point and a negative bias bus 203 connected to a suitable negative biasing potential source 200.

*Component control circuits shown in FIGS. 2 and 2A*

The primary gate circuit 11 may include a pentode-type electron discharge device 205 connected as a gating tube and having an anode 206, a control grid 208 and a grid 209; and an electron discharge device 210 having a left-hand triode section 211 and a right-hand triode section 212 with control grids 214 and 215, respectively, and connected as a double-stability trigger circuit. The control grid 208 of the gating tube 205 may be connected through a conductor 216 to the control grid 215 of the right-hand triode section 212.

A manual starting circuit for the primary gate circuit 11 may comprise two series resistors 218 and 219, a capacitor 220 and a single-pole-double-throw switch 221. The series resistors 218 and 219 may be bridged between the positive bus 201 and the negative biasing bus 203. The capacitor 220 may be connected between the negative biasing bus 203 and the movable contact of the switch 221. In its normal position, the switch 221 may connect the capacitor 220 to a point intermediate the resistors 218 and 219. In its operative position, the switch 221 may connect the capacitor 220 to the control grid 215 of the right-hand triode section 212.

The switching circuit CM may include an electron discharge device 225 having a left-hand triode section 226 and a right-hand triode section 227. The left-hand triode section 226 may include an anode 228 and a control grid 229. The right-hand triode section 227 may include a control grid 230. The electron discharge device 225 is connected as a conventional double-stability trigger circuit.

The switching means CM may also include a pentode-type electron discharge device 231 having an anode 232, a control grid 233 and another grid 234, and connected as a gating tube. The control grid 233 of the gating tube 231 may be directly coupled to the control grid 229 of the left-hand triode section 226. Another pentode-type electron discharge device 235 may be included in the switching means CM and may have an anode 236, a control grid 237 and another grid 238. The control grid 237 of the gating tube 235 may be directly coupled to the control grid 230 of the right hand triode section 227. The anode 236 of the gating tube 235 may be connected through the conductor 30' to one of the summation counters S1 or S2, preferably the summation counter S1. The anode 232 of the gating tube 231 may be connected through the conductor 30" to the other of the summation counters S1 and S2, preferably S2.

The control grids 229 and 230 of the left hand triode section 226 and the right hand triode section 227, respectively, may be capacitively coupled to the conductor 38 leading from the output of the time delay device TD1. The control grid 229 may also be connected through a conductor 31" to the comparator C2 and the control grid 230 may be connected through the conductor 31' to the comparator C1. The grids 234 and 238 of the gating tubes 231 and 235, respectively, may be connected through the conductor 28 to the output of the secondary gate circuit 25.

The switching circuit BF may include an electron discharge device 250 connected as a conventional double-stability trigger circuit and having a left hand triode section 251 and a right hand triode section 252. The left hand triode section 251 may include a control grid 254. The right hand triode section 252 may include a control grid 255. A triode-type electron discharge device 258 having a cathode 260 and a control grid 261 may be connected in a cathode follower circuit across the busses 201 and 203 with an output resistor 262 connected between the cathode 260 and the negative bias bus 203. The control grid 261 may be connected by a variable tap on a biasing resistor 263 to the control grid 254 of the left hand triode section 251, which may be connected between the control grid 254 and the negative bias bus 203.

In a similar manner, a triode-type electron discharge device 259 having a cathode 265 and a control grid 266 may be connected in a cathode follower circuit across the busses 201 and 203. An output resistor 268 may be connected between the cathode 265 and the negative biasing bus 203. The control grid 266 of the discharge device 259 may be connected through a variable tap to a resistor 269 serving as a biasing resistor between the control grid 255 of the right hand triode section 252 and the negative biasing bus 203. The cathodes 260 and 265 of the triodes 258 and 259 may be connected through conductors 32' and 32", respectively, to the summation counters S1 and S2 in order to condition the summation counters for either forward or backward operation, as will be described in greater detail hereinafter.

The time delay device TD1 may comprise an electron discharge device connected as a single-stability trigger circuit with a predetermined time constant and having a left hand triode section 281 and a right hand triode section 282. The left hand section 281 may include an anode 283 and a control grid 284. The right hand section 282 may include an anode 285 and a control grid 286. The anode 283 of the left hand section 281 may be connected to the plate supply bus 201 through a load resistor 288 having an intermediate tap connected to the conductor 38 leading to the time delay device TD2 and the switching circuit CM. The anode 285 may be capacitively coupled to a conductor 291 leading to a control grid 292 of a triode-type electron discharge device 294 having an anode 295. The control grid 292 may be biased by connection to an intermediate tap on a resistor 296 bridged between the ground bus 202 and the negative biasing bus 203. A resistor 298 may serve as a load resistor for the electron discharge device 294 and be connected between the plate supply bus 201 and the anode 295. A variable tap 299 on the load resistor 298 may be connected to the conductor 36, which is capacitively coupled to the control grid 255 of the right hand triode section 252 of the BF trigger device 250.

The time delay device TD2 may comprise an electron discharge device having a left hand triode section 301 and a right hand triode section 302 connected as a single-stability trigger circuit having a predetermined time constant. The left hand triode section 301 may include an anode 304 and a control grid 305. A load resistor 306 may be connected between the anode 304 of the left hand triode section 301 and the plate supply bus 201 and have an intermediate tap thereon connected through the conductor 39 to the primary gate circuit 11 and through the conductor 40 to the switching circuit CK. The control grid 305 of the left hand triode section 301 may be capacitively coupled to the conductor 38 leading to the load resistor 288 of the time delay device TD1.

The time delay device TD3 may comprise an electron discharge device 310 having a left hand triode section 311 and a right hand triode section 312, connected as a single-stability trigger circuit having a predetermined time constant. The left hand triode section 311 may include an anode 314 and a control grid 315. A resistor 316 may be connected between the anode 314 and the plate supply bus 201 and have a tap thereon connected by the conductor 24 to the secondary gate circuit 25. The control grid 315 of the left hand triode section 311 may be capacitively coupled to the conductor 22 leading from the outputs of the comparators C1 and C2.

The secondary gate circuit 25 may comprise an electron discharge device 320 having a left hand triode section 321 and a right hand triode section 322, connected as a double-stability trigger circuit. The left hand triode section 321 may have an anode 324 and a control grid 325. The right hand triode section 322 may include a control grid 326. The control grids 325 and 326 may be capacitively coupled to the conductor 34 leading to the load resistor 316 of the time delay device TD3. A resistor 328 may be connected as a load resistor between the anode 324 and the plate supply bus 201 and have a tap thereon connected through the conductor 35 to the time delay device TD1 and the primary gate circuit 11.

A pentode-type electron discharge device 330 may be included in the secondary gate circuit 25 as a gating tube and have a control grid 331, another grid 332 and an anode 334. The control grid 331 may be directly coupled to the control grid 326 of the right-hand triode section 322 of the device 320. A triode-type electron discharge device 338 having an anode 340 and a control grid 339 may be connected as an inverter in the output circuit of the gating tube 330. This may be accomplished by connecting the control grid 339 of the inverter 338 to a variable tap on a resistor 341, which has one terminal connected to the ground bus 202 and the other terminal connected through a capacitor 342 to the anode 334. The inverted output of the gating tube 330 may be then capacitively coupled to the conductor 28 leading to the switching circuit CM.

*Details of comparators C1 and C2, and switching circuit CK*

The comparator C1 and its associated source 20 of a variable quantity may have substantially the same structure as the comparator C2 and the source 21 of a variable quantity. Accordingly, corresponding structure in each of the comparators C1 and C2 and the sources 20 and 21 have been designated by the same reference numerals, with those elements in the comparator C2 being identified by a primed number. Therefore, in discussing the structural arrangement of the elements in the circuit diagram of FIG. 3, reference will be had only to the source 20 and the comparator C1, it being understood that the description is equally applicable to the source 21 and the comparator C2.

The source 20 may comprise a tape or film 400 having a curve 401 thereon representative of some particular intelligence or signal. The tape 400 may be driven by a feeding mechanism 402. A stylus 404 may be adapted in a conventional manner to follow the curve 401 on the tape 400. Thus the stylus may be displaced mechanically as a function of the magnitude of the curve displacement from a predetermined zero position or datum line.

In order to convert the mechanical displacement of the stylus 404 into an electrical quantity, the stylus 404 may be connected to a variable tap 405 on a potentiometer 406, which may be energized from a suitable source of electrical energy 408. The variable tap 405 may be connected by a conductor 409 to a control grid 410 of a pentode-type electron discharge device 411 having an anode 412, a cathode 414, and a screen grid 415. The cathode 414 may be connected through a cathode biasing resistor 416 to the ground bus 202. The anode 412 may be connected by a conductor 418 through a resistor 419 to a control grid 420 of a gaseous discharge type, electron discharge device 421, having an anode 422 and a cathode 424. The anode 422 may be connected through a load resistor 425 to a high voltage plate supply bus 426. The high voltage plate supply bus 426 may be connected to the positive terminal 428 of a suitable high voltage source having a value greater than the source 198.

The output of the translator unit 18 may be connected through an electron discharge device 430 to the comparators C1 and C2. The electron discharge device 430 may have a left hand triode section 431 associated with the comparator C1 and a right hand triode section 431' associated with the comparator C2. Each triode section may comprise an anode 432, a control grid 434 and a cathode 435. The conductor 19 leading from the trans-
lator unit 18 may be connected to the control grid 434. The cathode 435 may be connected through a cathode biasing resistor 436 to the ground bus 202 and to the control grid 420 of the gaseous discharge device 421 through a resistor 438, a conductor 439, and the resistor 419. The anode 432 may be directly coupled to the high voltage plate supply bus 426. The conductor 419 may also be connected to a means for preventing spurious, relatively short fluctuations of higher potentials from causing premature operation of the comparator unit. This last-mentioned means may preferably include a tetrode-type electron discharge device 440 and a smoothing capacitor 441 arranged in a manner fully described in the aforementioned copending application Serial No. 270,411.

A potential stabilizing circuit for the gaseous discharge device 421 may include a resistor 446 and a pentode-type electron discharge device 445 bridged from the high voltage plate supply bus 426 to the ground bus 202. As described in greater detail in the aforementioned copending application Serial No. 270,411, a variable resistive network 448 may be connected between a source 449 of positive potential and the ground return bus 202 to a screen grid 450 of the electron discharge device 445. The cathode 424 of the gaseous discharge device 421 may be coupled to a point intermediate the resistor 446 and the electron discharge device 445.

An output signal may be taken from the gaseous discharge device 421 across the resistor 451 by means of a capacitor 452 connected to the cathode 424 and leading to a grid 454 in a pentode-type electron discharge device 455, having an anode 456, a control grid 458, and a cathode 459. The cathode 459 may be directly coupled to the ground return bus 202 and the anode 456 may be coupled to the plate supply bus 201 through a load resistor 460. The load resistor 460 may be common to the anode 456 in the comparator C1 and the anode 456' in the comparator C2. Further, the anodes 456 and 456' may be directly coupled to the conductor 22 leading to the time delay device TD3.

In order to maintain a linear relation between the input signal on the control grid 410 of the discharge device 411 and the output applied to the gaseous discharge device 421, the relative potential difference between the cathode 414 and the screen grid 415 may be maintained substantially constant in the manner described in the aforementioned copending application Serial No. 270,411. For example, the conductor 409 leading from the variable tap 405 on the potentiometer 406 may also be connected to a control grid 461 of a tetrode-type electron discharge device 462 having an anode 464 and a cathode 465. The cathode 465 may be coupled to the ground return bus 202 through a cathode biasing resistor 466. The anode 464 may be directly coupled to the high voltage plate supply bus 426. A voltage regulating device 468, which may be of any suitable conventional type, having a cathode 469 and an anode 470, and a resistor 471 may be bridged across the electron discharge device 462. More particularly, the cathode 469 of the voltage regulating device 468 may be connected to the cathode 465 of the electron discharge device 462 and the plate 470 of the voltage regulating device 468 may be connected through a conductor 472 to the resistor 471 and thence to the high voltage plate supply bus 426. The anode 470 of the voltage regulating device 468 may also be directly coupled to the screen grid 415 of the electron discharge device 411.

A triode-type electron discharge device 478 having an anode 479, a control grid 480 and a cathode 481 may be connected across the gaseous discharge device 421, in order to extinguish the device 421 in the manner described in the aforementioned application Serial No. 270,411. More particularly, the anode 479 of the triode 478 may be directly coupled to the anode 422 of the gaseous discharge device 421. The cathode 481 may be directly coupled to a suitable source of reference potential, preferably a source of positive potential 482 having a potential less than the high positive potential of the bus 426. The control grid 480 of the triode 478 in the comparator C1 may be connected through a circuit including the conductors 42 and 42a to the switching circuit CK. Similarly, the control grid 480' of the triode 478' in the comparator C2 may be connected through a circuit including the conductors 43 and 42a to the switching circuit CK.

The switching circuit CK may comprise an electron discharge device 485 having a left-hand triode section 486 and a right-hand triode section 487, connected as a conventional double-stability trigger circuit. The left-hand triode section 486 may include a control grid 488 and the right-hand triode section 487 may include a control grid 489 and an anode 490. The conductor 42a may be directly coupled to the anode 490 of the right-hand triode section 487. The conductor 40 leading from the time delay device TD2 in FIG. 2 may be capacitively coupled to the control grid 488 of the left-hand triode section 486. The conductor 41 leading from the anodes 456 and 456' may be capacitively coupled to the control grid 489 of the right-hand triode section 487.

A further element in the switching circuit CK may include a pentode-type electron discharge device 492 having an anode 493, a grid 494, and a control grid 495. A conductor 499 leading from the anode 228 in the left-hand triode section 226 of the switching means CM in FIG. 2 may be capacitively coupled to the grid 494. A conductor 500 leading from the anode 285 in the right-hand triode section 282 of the time delay device TD1 may be capacitively coupled to the control grid 495. The anode 493 may be coupled to the plate supply bus 201 through a conductor 496, an operating coil 497 in the feeding mechanism 402 for the sources 20 and 21 of variable quantities, and the conductor 498.

*Detailed operation of the integrating system of FIG. 1 in view of the specific exemplary circuit components disclosed in FIGS. 2, 2A and 3*

Let us first consider the initial conditions of each of the circuit components. As shown in FIG. 2, the primary gate circuit 11 is closed. This is due to the fact that the left-hand triode section 211 is conductive and the potential on the control grid 208, which is directly coupled to the control grid 215, is at the least positive of two potentials, whereby the grid 208 is negatively biased to block the passage of positive pulses appearing on the grid 209. The switch 221 normally connects the capacitor 220 to the intermediate point between the resistors 218 and 219, whereby the capacitor is maintained charged to a potential sufficient to partially enable the gating tube 205 and trigger the trigger circuit 210.

In the secondary gate circuit 25, the left-hand triode 321 of the double stability trigger circuit 320 is conductive and the control grid 331, which is directly coupled to the control grid 326 of the right-hand triode section 322, is sufficiently negatively biased to block the passage of positive pulses from the pulse generator 10 which appear on the grid 332 of the gating tube 330. Thus, the secondary gate circuit 25 is also initially closed.

As for the switching device BF, it is seen in FIG. 2 that the left-hand triode section 251 is initially conductive and the right-hand triode section 252 is initially nonconductive. Under these conditions, the control grid 254 in the left-hand triode section 251 will be at a more positive potential than the control grid 255. Therefore, there will be a greater voltage drop across the resistor 263 than across the resistor 26a. That being true, the potential on the grid 261 of the triode 258 is higher than the potential on the grid 266 of the triode 259, and the tube 258 is more conductive than the tube 259. In these circumstances, the voltage drop across the cathode biasing resistor 262 of the tube 258 will be greater than the voltage drop across the cathode biasing resistor 268 of the triode 259 and the potential on the conductor 32' will be more positive than the potential on the conductor 32''. As will be explained in detail hereinafter, this potential arrangement on the conductors 32' and 32'' serves to condition the summation counters S1 and S2 to operate in a backwardly direction.

As for the switching means CM, the double-stability trigger circuit 225 is initially conditioned so that the right-hand triode section 227 is conductive and the potential of the grid 230 is more positive than the potential of the grid 229. Thus, the control grid 237 of the right-hand gating tube 235, which is directly coupled to the control grid 230 of the right-hand triode section 227, is more positive than the control grid 233 of the left-hand gating tube 231. In fact, the potential on the control grid 237 is sufficient to partially enable the right-hand gating tube 235 so that the presence of positive pulses on the grid 238 will cause the right-hand gating tube 235 to conduct and pass the positive pulses as negative pulses over the conductor 30' to the summation counter S1. Therefore, the initial condition of the switching means CM is such that the summation counter S1 is selected in preference to the summation counter S2 to receive pulses from the secondary gate circuit 25, when the secondary gate circuit 25 is opened.

The comparator C1 is also initially selected to operate in preference to the comparator C2, by means of the switching means CM. The potential on the conductor 31', which is connected to the control grid 230 of the right-hand triode section 227 of the switching means CM, is more positive than the corresponding potential on the conductor 31'' connected to the control grid 229 of the left-hand triode section 226. The conductor 31' is connected to the control grid 458 of the discharge device 455 in the comparator C1 and the conductor 31'' is connected to the control grid 458' in the discharge device 455' in the comparator C2. Therefore, the more positive potential of the conductor 31' and the control grid 458 partially enables the discharge device 455 so that a negative pulse will be transmitted over the conductor 22 to the time delay device TD3 upon the firing of the gaseous discharge tube 421 of the comparator C1.

As for the time delay devices TD1, TD2 and TD3, it is seen that they are each initially in their stable state with the left-hand triode sections 281, 301 and 311, respectively, conducting.

At the start of a complete integrating cycle, the starting switch 221 in the primary gate circuit 11 is manually moved from its position shown in FIG. 2 to its operative position, contacting the control grid 215 in the right-hand triode section 212 of the double-stability trigger circuit comprising the electron discharge device 210, and the control grid 215 becomes sufficiently positive to trigger the trigger circuit 210. Thus, the right-hand triode section 212 becomes conductive, the left-hand triode section 211 becomes nonconductive, and the control grid 215 of the right-hand triode section 212 becomes more positive. Since the control grid 208 is directly coupled to the control grid 215 through the conductor 216, the increase in potential on the control grid 215 is accompanied by a positive increase in potential on the control grid 208 of the gating tube 205, producing a zero bias on the grid 208 and partially enabling the gating tube 205.

Thus, the primary gate circuit 11 is opened and passes the constant repetition frequency pulses generated by the pulse generator 10. These pulses first appear on the grid 209 of the gating tube 205 as positive pulses and then appear as negative pulses in the conductor 15 by means of which they are fed to the counter and buffer circuit 14 (FIG. 1). As described in the aforementioned copending application Serial No. 270,411, these negative pulses cause the operation of the counter circuit 14 and an incrementally increasing count is manifested by the counter 14 for each of the negative pulses passed by the primary gate circuit 11. The count present in the counter and buffer circuit 14 is then converted by the translator unit 18 into an incrementally increasing reference signal having a value proportional to the count manifested by the counter and buffer circuit 14.

As previously described with relation to the system of FIG. 1, the counter or register 14 may be adapted to count from 00000 to 19999 and may include five denominational orders or banks of trigger circuits, namely, units, tens, hundreds, thousands and ten thousands.

When the last trigger circuit in the thousand order is returned to its Off condition, a negative pulse is supplied to the single trigger circuit in the ten thousand order (i.e., counting from 09999 to 10000). The negative pulse also acts to open the secondary gate circuit 25 and trigger the switching device BF, in a manner as will be hereinafter described.

As explained in detail in the aforementioned copending application Serial No. 270,411, the bias potential upon the cathode 424 (FIG. 3) of the gaseous discharge device 421 in relation to the anode 422 is adjusted by means of the variable resistive network 448, so that the gaseous discharge device 421 is barely extinguished, when the register or counter 14 is set at 00000 and the potentiometer 406 is at a predetermined reference potential with respect to the ground bus 202, and will fire when the reference potential developed by the translator unit 18 produces a small increase in potential of the control grid 420 with respect to the ground bus 202.

Since the setting of the stylus 404 causes a corresponding mechanical displacement of the variable tap 405 of the potentiometer 406, the electrical potential on the conductor 409 is proportional to the displacement of the potentiometer variable tap 405. Thus, for any one setting an electrical potential is placed on the conductor 409 corresponding to an instantaneous sample of a variable quantity represented by the curve 401 on the tape 400. This potential appears on the grid 410 and causes the conductivity of the electron discharge device 411 to be proportionate to the displacement. When there is a displacement of the stylus 404 following the curve 401 from the aforementioned reference value of the potentiometer 406, the tube 411 is made more conductive. Thus the zero bias potential present on the control grid 420 of the gaseous discharge device 421 is reduced by an amount proportionate to the displacement of the curve 401.

The incrementally increasing reference potential supplied by the translator unit 18 is fed over the conductor 19 to the control grid 434 of the electron discharge device 430. A corresponding incrementally increasing reference voltage is developed across the cathode output resistor 436 and fed through the resistor 438, the conductor 439 and the resistor 419 to the control grid 420 of the gaseous discharge device 421. Thus the incrementally increasing voltage across the cathode biasing resistor 436 serves to incrementally return the potential of the control grid 420 of the gaseous discharge device 421 to the firing potential.

When the reference potential reaches a value equal or proportional to the instantaneous sample of the variable quantity as detected by the stylus 404, the gaseous discharge tube 421 will be fired. When the gaseous discharge device 421 fires, the potential of the cathode 424 becomes substantially more positive. Since the grid 454 of the discharge device 455 is capacitively coupled through the capacitor 452 to the cathode 424, the tube 455 becomes conductive. A voltage drop is produced across the resistor 460, thereby substantially lowering the potential of the anode 456 and creating a negative-going pulse in the conductor 22 which triggers the single-stability trigger circuit 310 in the time delay device TD3.

In order to have both positive and negative excursions by the curve 401 on the tape 400 of the sources 20 and 21 of variable quantities, a zero datum line must be selected for the tape. The initial adjustment of the bias potential by the network 448 must be made so that the datum line on tape 400 corresponds to the point at which the device 421 will fire when the counter 14 has a count of 10000.

Before continuing with the discussion of the effect of triggering the time delay device TD3, let us first assume that the instantaneous sample of the variable quantity is negative relative to the zero datum line. Under these circumstances, the counter and buffer circuit 14 will not have arrived at a count of 10000. Therefore, the secondary gate circuit 25 and the switching device BF are still in their initial conditions.

When the gaseous discharge tube 421 fires upon the coincidence in value between the reference signal fed over the conductor 19 from the translator unit 18 and the instantaneous sample fed over the conductor 409, a negative pulse is transmitted over the conductor 22 to the control grid 315 (FIG. 2a) of the left-hand triode section of the time delay device TD3. This negative pulse triggers the time delay device TD3 to its unstable condition, where the right hand triode section 312 is conductive. After a predetermined period of time, the trigger circuit 310 automatically switches back to its stable condition, where the left hand triode section 311 is conductive.

At the initial triggering of the time delay device TD3, a positive-going pulse will be transmitted over the conductor 24 to the control grids 325 and 326 of the left hand triode section 321 and the right hand triode section 322, respectively, of the trigger circuit 320 in the secondary gate circuit 25. However, the trigger circuit 320 is designed so that this positive pulse does not trigger the trigger circuit 320. When the trigger circuit 310 in the time delay device TD3 switches back to its stable condition, a negative-going pulse is produced in the load resistor 316 and is fed by the conductor 24 to the control grids 325 and 326 of the trigger circuit 320.

This negative-going pulse triggers the trigger circuit 320 into its alternate stability condition, where the right hand triode section 322 is conductive. When the right hand triode section 322 is conductive, the potential on the control grid 331 of the gating tube 330 is sufficiently positive that the positive pulses present on the grid 332 from the pulse generator 10 cause the gating tube 330 to be conductive. Thus negative-going pulses are taken from the anode 334 through the capacitor 342 and appear across the resistor 341. The negative-going pulses are inverted by the triode discharge device 338 and transmitted through the conductor 28 as positive-going pulses. It is noted that the amplitude of the output pulses from the secondary gate circuit 25 may be adjusted by means of the variable resistor 341 in the input to the grid 339.

The positive-going pulses from the secondary gate circuit 25 travel through the conductor 28 and the conductors 28' and 28" to the control grids 238 and 234 of the right hand gating tube 235 and the left hand gating tube 231, respectively, of the switching means CM. Since the right hand gating tube 235 is partially enabled by the presence of a zero bias potential upon the control grid 237 and the left hand gating tube 231 is biased off, the switching means CM functions to preferentially send the positive-going pulses over the conductor 30' as negative-going pulses to the summation counter S1 instead of to the summation counter S2 via the conductor 30".

Under these conditions, the counter and buffer circuit 14 continues to count the pulses fed to it through the primary gate circuit 11 and the secondary gate circuit 25 passes pulses to the summation counter S1. As previously explained, when the counter circuit 14 passes from 09999 to 10000, a negative-going control pulse is transmitted over the conductor 34 to the switching device BF and the secondary gate circuit 25. This negative pulse appears on the control grids 325 and 326 of the secondary gate trigger circuit 320 and causes it to change its stability condition, thereby making the triode section 322 non-conductive and the triode section 321 conductive. Thus the potential on the control grid 331 of the gating tube 330 becomes more negative and the tube 330 no longer continues to pass the positive pulses from the pulse generator 10.

The negative-going pulse on the conductor 34 also causes the switching device BF to switch its alternate stability condition, where the right hand triode section 252 is conductive, thereby making the potential on the conductor 32″ more positive than the potential on the conductor 32′ and conditioning the summation counters S1 and S2 to operate in a forward direction, as will be explained hereinafter.

When the secondary gate trigger circuit 320 returns to its initial stability condition, the potential on the anode 324 becomes more negative and the voltage drop across the load resistor 328 increases. This produces a negative-going pulse on the conductor 35, which is capacitively coupled to the control grid 215 of the primary gate trigger circuit 210 as well as the control grid 284 of the left hand triode section 281 of the time delay device TD1 trigger circuit 280. This negative-going pulse appearing on the control grid 215 of the trigger circuit 210, causes the trigger circuit 210 to return to its initial stability condition with the left hand triode section 211 conductive. In this initial stability condition for the trigger circuit 210, the potential on the control grid 208 of the gating tube 205 becomes less positive and the gating tube 205 is disabled. Thus the passage of the pulses from the pulse generator 10 to the counter and buffer circuit 14 is blocked.

The negative-going pulse, which appears on the control grid 284 of the left hand triode section 281 of the time delay device TD1 trigger circuit 280, triggers the circuit 280 to its unstable condition, where the right hand triode section 282 is conductive. After a predetermined period of time, the trigger circuit 280 returns to its stable condition with the left hand triode section 281 conductive. Upon its return to the stable condition, the anode 283 becomes less positive and a greater voltage drop appears across the load resistor 288, thereby producing a negative-going pulse in the conductor 38.

The negative-going pulse in the conductor 38 appears on the control grid 305 of the left hand triode section 301 of the time delay device TD2 trigger circuit 300 and causes it to switch to its unstable condition. After a predetermined time constant, the trigger circuit 300 returns to its stable condition and a negative-going pulse is produced across the load resistor 306, when the anode 304 and the left hand triode section 301 becomes more negative. This negative-going pulse is fed over the conductor 39 to the control grid 214 of the primary gate circuit, and causes the trigger circuit 210 to switch to its alternate stability condition, thereby increasing the potential of the control grid 208 of the gating tube 205 in a positive direction so as to partially enable the gating tube 205. Thus a new measuring cycle is automatically initiated.

Therefore, it is seen that the switch 221 in the primary gate circuit 11 need be actuated only once to initiate the overall operation of the apparatus and from that point on the system automatically resets itself. The resetting of other components of the apparatus will now be discussed.

It will be recalled that a negative-going pulse was produced in the conductor 38 when the time delay device TD1 returned to its initial stability condition. Besides triggering the time delay device TD2, this negative-going pulse is fed over the conductor 38 to the control grids 229 and 230 of the double-stability trigger circuit 225 in the switching means CM, and causes the trigger circuit 225 to switch to its alternate stability condition, wherein the left-hand triode section 226 is conductive and the right-hand triode section 227 is nonconductive. This change in stability condition causes the potential on the control grid 237 of the gating tube 235 to become more negative, thereby disabling the gating tube 235. At the same time, the potential on the control grid 233 of the left-hand gating tube 231 becomes more positive and enables the gating tube 231 to pass the positive pulses appearing on the grid 234 from the conductor 28″ over the conductor 30″ to the summation counter S2. Thus, the switching means CM is operated to preferentially select the summation counter S2 for the next even-numbered measuring cycle.

It will be recalled that when the counter and buffer circuit 14 went from the count of 09999 to 10000, a negative-going control pulse appeared on the conductor 34 and caused the switching device BF to condition the summation counters S1 and S2 to operate in a forward direction. In order to return the switching device BF to its initial condition, a negative-going pulse must be fed over the conductor 36 from the time delay device TD1 to the control grid 255 of the right hand triode section 252 of the BF switching trigger 250, which is at this time conductive. This is accomplished by means of the triode 294 in the time delay device TD1. When the time delay trigger circuit 280 returns from its unstable condition to its initial stability condition, the anode 285 of the right hand triode section 282 increases positively in potential, as the right hand triode section 282 becomes non-conductive.

This increase in positive potential of the anode 285 produces a positive-going pulse on the control grid 292 of the triode 294 since the control grid 292 is capacitively coupled to the anode 285. The triode 294 then becomes more conductive and the voltage drop across the load resistor 298 sharply increases, thereby producing a negative-going pulse on the control grid 255 of the right hand triode section 252 of the BF trigger 250. Thus the BF trigger circuit 250 is returned to its initial stability condition and the control potential upon the conductor 32′ is higher than the control potential upon the conductor 32″, thereby conditioning the summation counters S1 and S2 for backward operation.

Since the time delay devices TD1, TD2 and TD3 are single-stability trigger circuits, they automatically return to their initial stability condition and stand ready for the next cycle of operation. The secondary gate circuit 25 is also in its initial closed or disabled condition, and is ready for the next measuring cycle.

Returning to the comparator circuits C1 and C2 (FIG. 3), the switching circuit CK operates in the following manner to restore the comparator units to their initial condition in preparation for the succeeding cycle of operation.

The switching circuit CK, along with the triodes 478 and 478′, operates to extinguish the gaseous discharge devices 421 and 421′. More particularly, when either of the gaseous discharge devices 421 or 421′ is fired and a negative control pulse is placed on the conductor 22 leading to the time delay device TD3, a negative control pulse is also sent over the conductor 41 to the control grid 489 of the right-hand triode section 487 of the CK trigger 485.

In its initial condition, the double-stability trigger circuit 485 has its right hand triode section 487 conductive and its left-hand triode section 486 nonconductive. Therefore, when the negative pulse on the conductor 41 is fed to the control grid 489, the trigger circuit 485 switches to its alternate condition of stability. When this occurs, the potential on the anode 490 becomes more positive, and a positive-going pulse is transmitted over the conductor 42a, 42 and 43 to the control grids 480 and 480′ of the triodes 478 and 478′. The triodes 478 and 478′ become highly conductive and draw a large amount of current through the load resistors 425 and 425′ of the gaseous discharge tubes 421 and 421′. As a result of this increase in current flow through the load resistors 425 and 425′, the potential on the anodes 422 and 422′ is lowered below the potential of the cathodes 424 and 424′, and the gaseous discharge devices 421 and 421′ are extinguished.

Referring now to the time delay device TD2 (FIG. 2), when the trigger circuit 300 returns to its stable condition, a negative-going pulse is created in the load resistor 306. This negative-going pulse is transmitted over the conductor 40, as well as the previously mentioned conductor 39, and appears on the control grid 488 (FIG. 3) of the left-hand triode section 486 of the CK trigger circuit 485. Thus, the trigger circuit 485 is triggered back to its initial stability condition for the start of the next measuring cycle.

Having considered the operation of the circuit through an initial odd-numbered measuring cycle, wherein the comparator C1 and the summation counter S1 have been utilized, and the instantaneous sample of the variable quantity input has had a negative value, let us now consider a second or even-numbered cycle wherein the comparator C2 and the summation counter S2 will be utilized. As aforementioned, the switching means CM is in its alternate stability condition at the start of the even-numbered cycles, so that the comparator C2 and the summation counter S2 are preferentially selected. Further, let us assume that the instantaneous sample of the curve 401′ has a positive value for this particular cycle.

The negative-going control pulse in the conductor 39 (FIG. 2) automatically starts the second measuring cycle by triggering the primary gate trigger circuit 210, so that the potential on the control grid 208 attains a sufficient positive value to partially enable the gating tube 205 and allow the pulses from the pulse generator 10 to be passed as negative pulses to the counter and buffer circuit 14.

Since the instantaneous sample being considered for this cycle is assumed to have a positive value, a coincidence will not be achieved between the instantaneous sample and the reference potential of the translator unit 18 before the counter circuit 14 switches from 09999 to 10000. However, when the count changes to 10000, a negative control pulse is fed over the conductor 34 to the switching device BF and the secondary gate circuit 25, in the same manner as previously mentioned with regard to the first measuring cycle. The switching device BF is operated to condition the summation counters S1 and S2 for forward operation. Since the secondary gate circuit 25 is still in its initial or closed condition, the negative-going pulse on the conductor 34 opens the secondary gate circuit 25 by triggering the secondary gate trigger circuit 320. Therefore, constant repetition frequency, positive pulses are passed out on the conductor 28 through the left hand gate tube 231 of the switching means CM to the summation counter S2.

Since the summation counter S2 is now operating in a forward direction, a count having a value equal to the instantaneous sample of the variable quantity is added to the previous sum on the summation counter S2. This is in contrast to the previous cycle where the pulses transmitted to the summation counter S1, before the counter and buffer unit 14 reached the 10000 count, decreased or subtracted from the count previously on the summation counter S1.

When the value of the reference potential fed over the conductor 19 from the translator unit 18 reaches a value equivalent to the instantaneous sample, the gaseous discharge device 421′ (FIG. 3) is fired. A negative-going pulse is transmitted over the conductor 22 to the time delay device TD3 (FIG. 2a). This pulse triggers the time delay device TD3 for a predetermined time interval. At the end of that time interval, a negative-going trigger pulse is transmitted from the time delay device TD3 over the conductor 24 to the secondary gate circuit 25 and operates to trigger the trigger circuit 320, so as to disable the gating tube 330.

As in the previous cycle when the secondary gate circuit 25 is closed, a negative-going pulse is developed across the load resistor 328 and transmitted on the conductor 35 to trigger the trigger circuit 210 of the primary gate circuit 11, thereby closing the primary gate circuit 11. This negative pulse on the conductor 35 also serves to trigger the time delay device TD1, which after its predetermined time delay produces a negative-going output pulse on the conductor 38 and a positive-going output pulse through the conductor 291 to the control grid 292 of the triode device 294. In response to the positive-going pulse, a negative-going pulse is developed across the load resistor 298, which is fed to the control grid 255 of the right-hand triode section 252 of the BF trigger device 251 to return the BF switching device to its initial condition. Thus, the summation counters S1 and S2 are conditioned for backward operation in preparation for the next odd-numbered measuring cycle.

The negative-going control pulse on the conductor 38 operates the time delay device TD2 and triggers the switching means CM to its initial stability condition. Thus, the switching means CM preferentially selects the comparator C1 and the summation counter S1 for operation during the next odd-numbered cycle. The operation of the time delay device TD2 by the negative-going pulse on the conductor 38 from the time delay device TD1 produces a negative-going pulse on the conductor 39, which automatically initiates the next odd-numbered cycle, and another negative-going pulse on the conductor 40 which restores the CK trigger 485 to its initial condition.

In order to supply the next incremental instantaneous sample of the curve 401 to the comparator C1, it is necessary to operate the feeding mechanism 402 (FIG. 3). This is done by means of the electron discharge device 492, which, when conductive, energizes the operating coil 497 of the feeding mechanism 402.

More particularly, when the time delay device TD1 (FIG. 2a) is operated by the negative-going pulse on the conductor 35 upon the closure of the secondary gate circuit 25, the resultant positive-going pulse caused by the return of the trigger circuit 280 to its stable condition is passed over the conductor 500. Since the control grid 495 (FIG. 3) of the discharge device 492 in the switching circuit CK is capacitively coupled to the conductor 500 leading to the anode 285 of the TD1 right-hand triode section 282, a positive-going pulse appears on the control grid 495 when the TD1 trigger circuit 280 returns to its stable condition, viz., when the left-hand triode section 281 is conductive. This positive-going pulse on the control grid 495 serves to partially enable the discharge device 492.

Since the grid 494 of the discharge device 492 is capacitively coupled to the conductor 499 leading to the anode 228 of the left hand triode section 226 of the CM trigger circuit, a positive-going pulse will appear on the grid 494 whenever the left hand trigger section is changed from a conductive to a non-conductive state. This occurs only at the end of even-numbered measuring cycles. Therefore, a coincidence of positive-going pulses on the grids 494 and 495 of the discharge device 492 will only occur at the end of the even-numbered measuring cycles. When this coincidence occurs, the discharge device 492 becomes conductive and the operating coil 497 of the feeding mechanism 402 is energized.

Details of the summation counter

Referring now to FIG. 4, a plurality of double-stability trigger circuits are cascaded in different denominational banks of scale-of-ten circuits. However, these scale-of-ten circuits are adapted to operate in a manner different from the conventional scale-of-ten circuits, in that they may be conditioned to operate both forwardly and backwardly.

More particularly, each of the summation counters S1 and S2 may comprise five different denominational banks or orders of scale-of-ten circuits, for example, a units order circuit 550, a tens order circuit 551, a hundreds order circuit 552, a thousands order circuit 553 and a ten thousands order circuit 554. Each of the denominational order circuits 550 through 553, inclusive, may comprise four double-stability trigger circuits 561, 562, 563 and 564, arranged in an identical manner in each of the order circuits. However, the ten thousands order circuit 554 may comprise a single double-stability trigger circuit 561''''. The trigger circuits 561, 562, 563 and 564 correspond to the 1, 2, 4 and 8 digits in each of the denominational orders.

Further, each of the trigger circuits 561, 562, 563 and 564 may have neon indicators or glow tubes 566, 567, 568 and 569, respectively, and resetting means including diode-type electron discharge devices 570, 571, 572 and 573, respectively, associated therewith. The diode-type discharge devices 570 through 573, inclusive, may be individually connected to the control grid of one triode section of each of the double-stability trigger circuits and to a common conductor 574 leading to a terminal 575, which may be connected to a suitable reset potential source.

A pair of dual triode-type electron discharge devices may be connected to the load resistors of each of the double-stability trigger circuits 561 through 564, inclusive, as an output means. For example, a pair of triodes 578 and 579 may be connected to the load resistors 580 and 581 associated with the right-hand and left-hand triode sections of the trigger circuit 561, respectively. The triode discharge device 578 may include an anode 582 and a control grid 583 and the triode discharge device 579 may include an anode 585 and a control grid 586.

The anodes 582 and 585 may each be connected through a common load resistor 590 to the plate supply bus 201. The control grid 583 of the left hand output triode 578 may be capacitively coupled to the load resistor 580 of the right hand triode section of the trigger circuit 561. The control grid 586 of the right hand output triode 579 may be capacitively coupled to the load resistor 581 of the left hand triode section of the trigger circuit 561. The control grids of the right and left hand triode sections of the next trigger circuit 562 may be capacitively coupled to the common load resistor 590 for the output triodes 578 and 579. The control grids 583 and 586 of the output triodes 578 and 579, respectively, may be connected through their respective biasing resistors 588 and 589 to the conductors 32'' and 32', respectively.

A pair of twin output triodes 591 and 592 having a common load resistor 594 may be similarly connected between the trigger circuit 562, having a load resistor 593 in its left hand triode section, and the trigger circuit 563. Another pair of twin triodes 595 and 596 may be coupled to the load resistors of the trigger circuit 563 in the same manner as the twin output triodes 578 and 579 are coupled to the load resistors in the trigger circuit 561. However, instead of having a common load resistor, the triode 595 may have its own load resistor 598 and the triode 596 may have its own load resistor 599. The load resistor 598 of the left hand output triode 595 may be capacitively coupled to the control grid of the left hand triode section of the trigger circuit 564, and the load resistor 599 of the right hand output triode 596 may be capacitively coupled to the control grid of the right hand triode section of the trigger circuit 564.

A load resistor 600 may be coupled to the left hand triode section of the trigger circuit 564 and another load resistor 601 may be coupled to the right hand triode section of the trigger circuit 564. A pair of dual triode-type electron discharge devices 602 and 603 having a common load resistor 604 may be arranged as output triodes for the trigger circuit 564 in the same manner as the output triodes 578 and 579 for the trigger circuit 561.

A pentode-type electron discharge device 606 having a control grid 608, a cathode 609, a suppressor grid 610 and an anode 611 may be bridged between a conductor 612 and the ground return bus 202. The conductor 612 may connect the anode 611 to the load resistor 593 associated with the left hand triode section of the trigger circuit 562. The suppressor grid 610 may be connected by a variable tap to a biasing resistor 614 bridged between the plate supply voltage bus 201 and the conductor 32''. The control grid 608 may be connected to a point intermediate two biasing resistors 615 and 616 bridged between a conductor 618 leading to the load resistor 600 of the trigger circuit 564 and the negative biasing bus 203. The control grid 608 may also be capacitively coupled through a capacitor 619 to the load resistor 601 associated with the right hand triode section of the trigger circuit 564.

Another pentode-type electron discharge device 624 may be bridged between the conductor 612 leading to the load resistor 593 in the trigger circuit 562 and the ground return bus 202. The discharge device 624 may have a cathode 625, a control grid 626, a suppressor grid 628 and an anode 629. The suppressor grid 628 may be connected to a variable tap on a biasing resistor 630 bridged between the plate supply voltage bus 201 and the conductor 32'. The control grid 626 may be connected to a point intermediate two biasing resistors 631 and 632 bridged between the plate supply bus 201 and the negative biasing bus 203. The control grid 626 may also be capacitively coupled through the capacitor 634 to the load resistor 600 associated with the left hand triode section of the trigger circuit 564.

A variable tap on the resistor 631 between the control grid 626 and the plate supply voltage bus 201 may be connected by a conductor 635 and a resistor 636 having a variable tap to the negative biasing bus 203. Thus the resistor 636 is placed in parallel with the portion of the resistor 631, below the variable tap, and the resistor 632.

Four triode-type electron discharge devices 638, 639, 640 and 641 may be coupled between the conductor 635 and the ground return bus 202, and have control grids 642, 643, 644 and 645, respectively. The control grids 642, 643, 644 and 645 may be connected by means of the conductors 646, 647, 648 and 649 to the control grids of the right hand triode sections of the trigger circuits 561, 562, 563 and 564, respectively.

A pentode-type electron discharge device 650 may be connected between the load resistor 598 and the ground return bus 202 in parallel with the output triode 595 of the trigger circuit 563. The discharge device 650 may include a cathode 651, a control grid 652, a suppressor grid 654 and an anode 655. The anode 655 may be directly coupled to the load resistor 598 by means of a conductor 656. The suppressor grid 654 may be connected to the variable tap on the resistor 636. The control grid 652 may be connected by a conductor 658 to the control grid 586 of the right hand output triode 579 for the trigger circuit 561.

A triode-type electron discharge device 659 may be connected between the load resistor 599 of the right hand output triode 596 of the trigger circuit 563 and the ground return bus 202. The triode 659 may comprise an anode 660 and a control grid 661. The anode 660 may be directly coupled to the load resistor 599 by means of a conductor 664. The control grid 661 may be connected by means of a conductor 662 to the control grid 583 of the left hand output triode 578 of the trigger circuit 561.

The output load resistor 604 of the 8 digit trigger circuit 564 of the units counting order 550 may be connected to the input of the 1 digit trigger circuit in the tens order 551 by means of a conductor 665. Similarly, the output of the tens order 551 may be connected to the input of the hundreds order 552 by means of a conductor 666 and the output of the hundreds order 552 may be connected to the input of the thousands order 553 by means of a conductor 667.

As shown in FIG. 4, the ten thousands order 554 may include only the 1 digit trigger circuit 561'''' having a neon indicator 566'''' and a reset diode 570''''. The trigger circuit 561'''' may be connected to the output of the thousands order 553 by means of a conductor 668.

Operation of summation counter

Let us now discuss the operation of the summation counter shown in FIG. 4. As previously stated with relation to the operation of the overall system, the switching circuit BF is initially conditioned at the start of each measuring cycle to place the higher potential on the conductor 32' (FIG. 2) relative to the ground return bus 202 and the lower potential on the conductor 32" relative to the ground return bus 202. Thus the summation counters S1 and S2 are conditioned to operate backwardly when the comparators C1 and C2 are operated by a neagtive instantaneous sample.

However, when the instantaneous sample has a positive value, the switching device BF, as aforementioned, is switched to its alternate stability condition when the counter 14 reaches a predetermined zero reference value, i.e. in the preferred embodiment, a count of 10000. In this alternate condition, the potential on the conductor 32" is the higher relative to the ground return bus 202 and the potential on the conductor 32' is the lower relative to the ground return bus 202. As a result of the reversal of potential between the conductors 32' and 32", the summation counters S1 and S2 are conditioned to operate in a forwardly direction for positive instantaneous samples.

Let us first assume that the summation counter is conditioned to operate in a forward direction, i.e., the potential on the conductor 32" is high relative to the potential on the conductor 32'. Further, let us assume that the summation counter has been reset to its initial position. Since the summation counter must be able to manifest both positive and negative sums, it is necessary that a zero value be assumed at a point intermediate the counting range of the summation counter.

In the preferred embodiment, the predetermined zero value is assumed to be when the summation counter is reset to a value of 10000. Such a setting is designated in FIG. 4 by the appropriate shading of the conductive sides of the trigger circuits therein. More particularly, the left hand triode sections of each of the trigger circuits 561, 562, 563 and 564 in the different denominational order banks 550, 551, 552 and 553 are initially conductive. However, in the ten thousand order 554, the right hand triode section of the sole trigger circuit 561'''' is conductive.

When the secondary gate circuit 25 is opened, at the time that the counter circuit 14 reaches a count of 10000, negative pulses are transmitted over the conductor 30 to the control grids of the trigger circuit 561. In this illustration let us assume that a count greater than 10 is being added to the summation counter S1. The first negative pulse triggers the 1 digit trigger circuit 561 to its On condition, wherein the right hand triode section is conductive and the left hand triode section is non-conductive. The higher potential on the conductor 32" relative to the ground return bus 202 is sufficient to partially enable the left hand output triodes 578, 591, 595, and 602. The right hand output triodes 579, 592, 596 and 603 are disabled, since the potential on the conductor 32' is insufficient to partially enable the right hand output triodes, thereby biasing them off.

The change in condition of the trigger circuit 561 produced by the first negative pulse over the conductor 30 causes a negative-going pulse to be produced in the load resistor 580. Obviously, this negative pulse when it appears on the grid 583 of the left hand output triode 578 does not render it conductive. On the other hand, a positive-going pulse is produced in the load resistor 581. However, when this positive-going pulse is fed to the control grid 586 of the right hand output triode 579, it is insufficient to overcome the negative bias on the grid 586.

When the second negative pulse arrives on the conductor 30, the trigger circuit 561 is restored to its initial or Off condition. When this occurs, a positive-going pulse is produced in the load resistor 580 and causes the left hand output triode 578 to conduct. Conduction by the left hand triode 578 causes a negative-going pulse to be produced in the load resistor 599 which triggers the 2 digit trigger circuit 562 to its On condition. The third negative pulse merely turns the 1 digit trigger circuit 561 On.

The fourth negative pulse turns the trigger circuit 561 Off and produces a negative pulse across the load resistor 590 which turns the trigger circuit 562 Off. When the trigger circuit 562 is restored to its initial Off condition, a negative-going pulse is developed across the load resistor 594, in the same manner as the previously mentioned negative pulses are developed across the load resistor 590. The incoming negative pulses 5, 6, 7 and 8 on the conductor 30 operate the trigger circuits 561, 562, 563 and 564 in conventional counting fashion.

Since the count of 9 is represented by an On condition of the 1 digit trigger circuit 561 and the 8 digit trigger circuit 564 and an Off condition of the 2 digit trigger circuit 562 and the 4 digit trigger circuit 563, it is necessary to bias the 2 digit trigger circuit 562 to its Off condition, so that the ninth and tenth incoming negative pulses over the conductor 30 cannot trigger the circuit 562. This blocking is accomplished, when the summation counters S1 and S2 are operating in a forward direction, by means of the pentode discharge device 606.

With the higher of two potentials on the conductor 32", the voltage drop across the suppressor grid biasing resistor 614 is such that the suppressor grid 610 is at a zero bias condition, thereby partially enabling the discharge device 606. When the trigger tube 564 is in its initial Off condition, the left hand triode section is conductive and the larger of two voltage drops occurs across the load resistor 600, thereby placing the conductor 618 at a lesser potential than when the left hand triode section of the trigger circuit 564 is conductive. In this condition, the voltage drop across the resistors 615 and 616 is such that the control grid 608 is biased sufficiently to cut off the device 606.

When the trigger circuit 564 is switched to its On condition in response to the eighth negative pulse, the voltage drop across the load resistor 600 decreases and the potential on the conductor 618 becomes more positive. This serves to increase the voltage drop across the resistor 616 and raises the control grid 608 to a zero biasing condition. Thus the discharge device 606 is rendered conductive when the trigger circuit 564 is in its On condition and the summation counter is operating in a forward direction. Since the discharge device 606 is conductive, it draws a substantial amount of current through the load resistor 593 of the left hand triode section of the 2 digit trigger circuit 562, thereby biasing the 2 digit trigger circuit 562 to an Off condition.

The ninth negative pulse merely serves to switch On the 1 digit trigger circuit 561. The tenth negative pulse triggers the 1 digit circuit 561 to its initial Off condition. This change in condition renders the left hand output triode 578 conductive and a negative-going pulse is produced across the load resistor 590, in the usual manner. However, since the 2 digit trigger circuit 562 is biased to its Off condition by the discharge device 606, the negative pulse developed across the load resistor 590 has no effect upon the trigger circuit 562.

The positive-going pulse produced across the load resistor 580 is coupled through the conductor 662 to the control grid 661 of the triode 659. This positive-going pulse renders the triode 659 conductive and produces a negative-going pulse in the load resistor 599. Since the load resistor 599 is capacitively coupled to the control grid of the right hand triode section of the 8 digit trigger circuit 564, this trigger circuit is switched to its Off condition, wherein the left hand triode section is conductive and the right hand triode section is non-conductive.

As a result of this change in the stability condition of the 8 digit circuit 564, a negative-going pulse is produced across the load resistor 600 lowering the potential of the conductor 618 and decreasing the voltage drop across the resistors 615 and 616. This decrease in the voltage drop across the resistors 615 and 616 tends to bias the control grid 608 of the discharge device 606 to cut off. However, at the same time, a positive-going pulse is produced across the load resistor 601 of the 8 digit trigger circuit 564. This positive-going pulse is capacitively coupled through the capacitor 619 to the control grid 608 and maintains the discharge device 606 conductive for a sufficient time to insure that the 2 digit trigger circuit 562 is not triggered On as a result of the change in the stability condition of the 1 digit trigger circuit 561.

When the 8 digit trigger circuit 564 is returned to its initial Off condition, the left hand output triode 602 is rendered conductive and a negative-going pulse is produced in the load resistor 604 which is carried over the conductor 665 to the tens order 551 to trigger the 1 digit trigger circuit of that order.

Thus it is seen that when the higher of two potentials is placed on the conductor 32″ and the lower of two potentials is placed on the conductor 32′ by the stability condition of the switching device BF, the summation counter operates forwardly in the same manner as a conventional scale of ten circuit.

Let us now consider the operation of the summation counter when the potential on the conductor 32′ is at the higher of two potentials and the potential on the conductor 32″ is at the lower of two potentials, i.e., conditioned by the switching device BF to operate in a backwardly direction. In discussing this backward operation, we shall assume that all of the trigger circuits in the summation counter have been reset to their initial conditions shown in FIG. 4.

The higher potential on the conductor 32′ partially enables the right hand output triodes 585, 592, 596 and 603. This higher potential also makes the potential on the suppressor grid 628 of the discharge device 624 more positive so as to bring it to its zero bias condition; whereas, the lower potential on the conductor 32″ lowers the potential on the suppressor grid 610 of the discharge device 606 and biases this latter discharge device to cut off.

Since none of the trigger circuits 561, 562, 563 or 564 are in an On condition, each of the triodes 638, 639, 640 and 641 are biased to cut off. The potential drop across the biasing resistor 632 for the control grid 626 of the discharge device 624 is at its highest value and the control grid 626 is at its zero bias potential. Thus the discharge device 624 is rendered conductive and the voltage drop across the load resistor 593 has sufficient value to bias the 2 digit trigger circuit 562 to its Off condition. Also the potential drop across the resistor 636 is at its highest value, and the suppressor grid 654 is at a zero bias potential.

Under these conditions, when the secondary gate circuit 25 starts to pass pulses from the pulse generator 10, the first negative pulse over the conductor 30 serves to trigger the 1 digit trigger circuit 561 to an On condition. This causes the left hand triode section of the trigger circuit 561 to become non-conductive and a positive-going pulse is developed across the load resistor 581. The positive-going pulse on the load resistor 581 renders the right hand output triode 579 conductive and a negative-going pulse is produced in the common load resistor 590. However, since the 2 digit trigger circuit 562 is biased to its Off condition by the conductivity of the discharge device 624, the negative-going pulse in the load resistor 590 has no effect upon it.

However, the positive-going pulse developed in the load resistor 581 is also coupled by means of the conductor 653 to the control grid 652 of the discharge device 650. The incidence of the positive pulse upon the control grid 652 renders the discharge device 650 conductive, thereby drawing current through the load resistor 598. Accordingly, a negative-going pulse is produced in the load resistor 598 which is capacitively coupled to the left hand triode section of the 8 digit trigger circuit 564 and triggers the trigger circuit 564 to its On condition.

This renders the right hand output triode 603 conductive and a negative-going pulse is produced in the load resistor 604 which is coupled by means of the conductor 665 to the tens order 551. As a result of this input pulse to the tens order 551, the 1 digit and 8 digit trigger circuits of the tens order are switched to an On condition and a negative pulse is sent over the conductor 666 to the hundreds order 552. The hundreds order 552 and the thousands order 553 are operated in the same manner. When the 8 digit trigger circuit of the thousand order 553 is operated to its On condition, a negative-going output pulse is sent over the conductor 668 to the 1 digit trigger circuit 561″″ of the ten thousand order 554. This negative-going pulse switches the trigger circuit 561″″ to its Off condition. Thus the incidence of one negative pulse on the conductor 30 has caused the summation counter to count backwardly from 10000 to 09999.

In each of the orders 550, 551, 552 and 553, since the 1 digit and 8 digit trigger circuits are in their On conditions, the triodes 638 and 641 have been rendered conductive. The conduction in these triodes serves to increase the voltage drop across the upper half of the resistor 631 and decrease the voltage drop across the resistors 632 and 636. This drop in potential across the resistor 632 tends to bias the discharge device 624 to cut off. When this occurs, the discharge device 624 becomes non-conductive and the 2 digit trigger circuit 562 is no longer biased to its Off condition. Thus there is the possibility that the negative-going pulse produced in the load resistor 590 in the output of the 1 digit trigger circuit 561 upon the incidence of the first negative pulse might still trigger the 2 digit trigger circuit 562 to its On condition. In order to prevent this, the capacitor 634 couples a positive-going pulse produced in the load resistor 600 of the 8 digit trigger circuit 564 left hand triode section to the control grid 626 of the discharge device 624, thereby maintaining the control grid 626 at its zero bias potential for a time interval sufficient to maintain the 2 digit trigger circuit 562 in its Off condition.

Thus in contrast to the normal operation of scale of ten circuits, wherein a trigger circuit is only operated after the preceding trigger circuit has gone from an Off to an On condition and then returned to an Off condition, the higher potential on the conductor 32′ serves to condition the output triodes of the trigger circuits so that the trigger circuits will be operated when the preceding circuit is first switched to its On condition.

The second pulse incident upon the conductor 30 causes the 1 digit trigger circuit 561 to return to its Off condition. In accordance with the above discussion, this action produces no effect upon the 2 digit trigger circuit 562, because the increase in potential on the control grid 583 from the positive-going pulse developed in the load resistor 580 is insufficient to overcome the low biasing potential on the conductor 32″. Thus the incidence of two pulses has caused the units order 550 to manifest a count of 8 and the overall effect upon the summation counter has been to subtract a count of 2 from the prior count manifested by the summation counter.

Upon the incidence of a third negative pulse on the conductor 30, the trigger circuit 561 is switched to its On condition. This causes a negative pulse to be developed in the load resistor 590 which triggers the 2 digit trigger circuit 562 to its On condition, since this latter trigger circuit is no longer biased to its Off condition by the discharge device 624.

When the 2 digit trigger circuit 562 is switched to its On condition, the 4 digit trigger circuit 563 is also switched to its On condition. The change in the stability condition of the trigger circuit 563 renders the output triode 596 conductive and a negative-going pulse is developed across the load resistor 599. This negative-going pulse is capacitively coupled to the control grid of the 8 digit trigger circuit 564 right hand triode and triggers the circuit 564 to its Off condition. Succeeding incoming negative pulses on the conductor 30 cause the trigger circuits 561, 562 and 563 to operate in a backward count. Further, since the right hand output triode 603 for the 8 digit trigger circuit 564 is partially enabled in preference to the left hand output triode 602, a negative output pulse is only produced in the conductor 665 when the trigger circuit 564 is switched to an On condition.

Thus the summation counter of FIG. 4 may be operated in either a backward or forward direction under the influence of the switching device BF, so that the count manifested by the counter 14 for each individual measuring cycle may be either added to or subtracted from the sum of the counts from the previous measuring cycles. Therefore, when the instantaneous samples of the variable quantities are taken at constant incremental intervals, the count manifested in the summation counters S1 and S2 is equal to or proportional to the first order of integration of the variable quantity.

*System for producing a plurality of integration steps*

Figure 5:
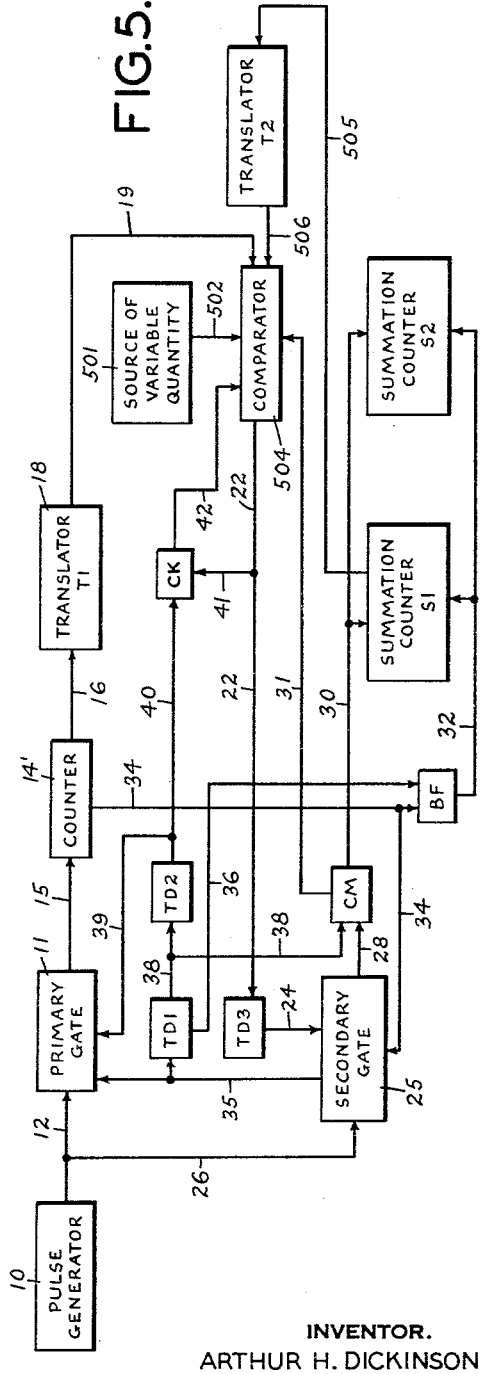
FIG. 5 is a schematic block diagram of another embodiment of the invention which provides a second order of integration for a variable quantity.

Referring now to FIG. 5, essentially the same circuits are used as in the previously discussed system of FIG. 1, with the following exceptions. Instead of having two independent sources 20 and 21 of variable quantities, a single source 501 of a variable quantity may be connected by a conductor 502 to a comparator 504. The output of the translator unit 18, hereinafter identified as translator T1, may be fed over the conductor 19 to the comparator 504. The operation of the comparator 504 may still be regulated by the switching circuit CM over the conductor 31 and the output of the comparator 504 may be taken over the conductor 22 to the time delay device TD3 in the same manner as FIG. 1. An additional translator unit T2 may be connected to the summation counter S1 by a conductor 505 and have its output connected by a conductor 506 to the comparator 504. The buffer unit may be eliminated from the counter circuit or register means 14'. If necessary, conventional limiting means may be incorporated in the counter circuit 14' to minimize line voltage variations.

The system of FIG. 5 operates in substantially the same manner as that of FIG. 1. More particularly, when the primary gate 11 is manually actuated at the start of the integrating cycle, pulses are fed from the pulse generator 10 to the counter 14'. The translator T1 provides a reference potential equal to or proportional to the count manifested by the counter 14'. This reference potential is fed to the comparator 504. When the reference potential coincides in value with the instantaneous sample of the variable quantity from the source 501, a control pulse is sent over the conductor 22 and the time delay device TD3 to operate the secondary gate circuit 25. Pulses from the pulse generator 10 are passed through the secondary gate circuit 25 and the switching means CM to the summation counter S1 to be either added to or subtracted from the prior count manifested by the summation counter, in exactly the same manner as the pulses are either added or subtracted in the summation counter S1 in FIG. 1. This occurs during the first and all odd-numbered cycles of operation in the system of FIG. 5. The count manifested by the summation counter S1 at the end of each individual measuring cycle of the instantaneous sample of the variable quantity from the source 501 is translated by the translator T2 into a reference potential, in the same manner that the translator T1 translates the count manifested by the counter 14' into a reference potential.

The reference potential produced by the translator T2 is then fed to the comparator 504 during the second and subsequent even-numbered cycles, as the quantity to which the reference potential from the translator T1 is compared. During the second and subsequent even-numbered cycles, a count is either added to or subtracted from the summation counter S2 in the same manner as in FIG. 1. However, the count manifested by the summation counter S2 instead of being a first order of integration of an independent variable quantity, is actually a first order of integration of the individual sums manifested by the summation counter S1 for each of the individual measuring cycles. Since those sums are in turn a first order of integration of a variable quantity, it is evident that the count manifested by the summation counter S2 is equal to or proportional to a second order of integration of the variable quantity from the source 501.

*Details of the comparator 504 in FIG. 5*

In FIG. 6, the source 501 of the variable quantity and the comparator 504 are shown in detail. Many of the circuit elements and connections shown in FIG. 6 are identical to the elements of the comparators C1 and C2 shown in FIG. 3 and bear the same reference numerals.

The source 501 of a variable quantity may comprise a photographic film 700 having sprocket holes 701 on each side thereof. A curve 702 representative of a continuous variable quantity may be placed on the film. The area 703 to the left of the curve 702 may be opaque and the area 703' to the right of the curve 702 may be translucent. A zero reference line may be assumed at a position intermediate the sprocket holes 701, thereby permitting the curve 702 to have positive and negative excursions representing positive and negative values of the variable quantity. The film 700 may be driven by the feeding mechanism 402.

Apparatus for reading the curve 702 may comprise a conventional cathode ray means 704 having vertical deflection plates 705 and horizontal deflection plates 706. The cathode ray means 704 may be energized by a conventional power supply 708, a vertical deflection control means 709 and a horizontal deflection control means 710. The horizontal deflection control means may be connected to the conductor 19 by means of a conductor 711.

The cathode ray means 704 may be positioned in relation to the film 700 in such a way that the beam from the cathode ray means 704 is adapted to sweep from left to right across the film 700 in a path normal to the zero datum line and pass through the translucent portion 703' of the film 700. A lens 712 may be placed on the side of the film 700 opposite to the cathode ray means 704 to collect and concentrate the beam from the cathode ray means 704 upon a conventional photoelectric means 714. The photoelectric means 714 may be connected in series relation with a conductor 715 and a resistor 716 between the power supply 708 and the ground or reference terminal 199. A capacitor 718 may connect a point intermediate the photoelectric means 714 and the resistor 716 on the conductor 715 to the negative bias bus 203 through a resistor 719. The resistor 719 may have a variable tap 720 connected by a conductor 721 to a suppressor grid 723 of a pentode-type electron discharge device 722 having a control grid 724.

The electron discharge device 722 is comparable to the pentode-type electron discharge device 455 of the comparator C1 in FIG. 3 and may be similarly connected to the load resistor 460 and the conductor 22.

The conductor 19 leading from the translator T1 may also be connected by a conductor 726 through the resistor 419 to the control grid 420 of the triode-type gaseous discharge device 421. The conductor 726 may also be connected to the smoothing circuit comprising the tetrode-type electron discharge device 440 and the capacitor 441.

The comparator unit may also include the plate to cathode voltage stabilizing circuit comprising the resistive network 448 and the pentode-type electron discharge device 445 as in FIG. 3, and the quenching tube 478 connected by the conductors 42, 43 to the switching circuit CK.

A pentode-type electron discharge device 728 having a control grid 729 and a suppressor grid 730 may be placed in circuit with the gaseous discharge tube 421 in the same manner as the pentode-type electron discharge devices 455 and 455' of the comparators C1 and C2 in FIG. 3 with the suppressor grid 730 being capacitively coupled through the capacitor 452 to the cathode 424 of the gaseous discharge device 421.

The control grid 724 of the discharge device 722 may be connected to the conductor 31' leading to the right hand side of the switching means CM and the control grid 729 of the discharge device 728 may be connected through the conductor 31" to the left hand side of the switching means CM. The discharge devices 722 and 728 may be enclosed within a common envelope 731 or in separate envelopes.

The conductor 506 leading from the translator T2 may be connected to a control grid 735 of a triode-type electron discharge device 736 having an anode 738 and a cathode 739 and connected as a cathode follower circuit between the high voltage plate supply bus 426 and the ground return bus 202. A cathode resistor 740 may be positioned between the cathode 739 and the ground return bus 202. The conductor 409 may be connected to a variable tap on the cathode resistor 740 and may couple the input from the translator T2 to the control grid 410 of the pentode-type electron discharge device 411.

The discharge device 411, its associated tetrode-type electron discharge device 462 and the voltage regulator means 468 are arranged in circuit with the gaseous discharge device 421, in the same manner as in the comparators C1 and C2 of FIG. 3. Accordingly, a detailed discussion of the control circuits that are identical with those in FIG. 3 will not be gone into with relation to FIG. 6.

The comparator of FIG. 6 operates in the following manner. The curve 702 represents a continuous variable quantity having second order differential characteristics. The horizontal deflection control of the cathode ray means 704 is responsive to the reference potential developed in the translator T1.

At the beginning of each individual measuring cycle, the beam from the cathode ray means 704 starts to progress from left to right across the film 700 as a function of the step-by-step increase of the reference potential in the translator T1. When the beam becomes coincident with the curve 702 and passes from the opaque portion 703 of the film to the translucent portion 703', the beam is collected by the lens system 712 and focused upon the photoelectric means 714, causing current to flow through the resistor 716. The current flow through the resistor 716 produces a voltage drop, which by virtue of the capacitive coupling of the resistor 719 through the capacitor 718 to the conductor 715 produces a positive pulse across the resistor 719. This positive pulse is carried over the conductor 721 to the suppressor grid 725 of the discharge device 722. During the initial individual measuring cycle and subsequent odd cycles, the switching means CM is in such a condition that sufficient potential is placed upon the conductor 31' to partially enable the discharge device 722. Thus a negative-going output pulse is created across the load resistor 460 in response to the positive pulse across the resistor 719 and is transmitted by the conductor 22 to the time delay device TD3.

During the remaining portion of the initial measuring cycle, the system of FIG. 5 functions in exactly the same manner as that of FIG. 1 to either add or subtract a count representative of the instantaneous sample in the summation counter S1. Toward the end of the initial or odd measuring cycle, the switching means CM operates to partially enable the discharge device 728 in preference to the device 722 by placing a zero bias potential upon the control grid 729 through the conductor 31".

The new sum that is manifested by the summation counter S1 is translated by the translator T2 into a signal potential which is carried by the conductor 506 to the control grid 735 of the cathode follower 736. The potential on the control grid 735 causes a control voltage to be developed across the cathode resistor 740, which is taken by the conductor 409 to the control grid 410 of the discharge device 411. The discharge device 411 functions in the manner described in relation to FIG. 3 and places a negative bias on the control grid 420 that is equal to or proportional to the instantaneous sample, in this case the value of the sum manifested by the summation counter S1 at the end of the particular measuring cycle.

As described with relation to the system of FIG. 1, the primary gate circuit 11 is opened and the counter 14' manifests an incrementally increasing count in response to the pulses from the pulse generator 10. This incrementally increasing count causes a step by step increase of a reference potential in the translator T1 which is fed over the conductor 19 and the conductor 726 to the control grid 420 of the gaseous discharge device 421. When the gaseous discharge device 421 is fired, the potential of the suppressor grid 730 is raised to a zero bias and a negative control pulse is developed across the load resistor 460 which is conducted by the conductor 22 to the time delay device TD3. Then, in the same manner as in the system of FIG. 1, a count is either added or subtracted in the summation counter S2. Thus the summation counter S2 manifests a count which is representative of the sum of all the individual sums manifested by the summation counter S1 at the end of each measuring cycle.

The switching device CK operates to quench the gaseous discharge tube 421 and to cause the feeding mechanism 402 to move the film 700 in a forward direction by a predetermined amount. Since the instantaneous samples of the curve 702 are taken at equal intervals, the count manifested by the summation counter S2 is either equal to or proportional to the value of a dependent variable of which the curve 702 is a second order differential.

Thus there has been provided novel and improved apparatuses for reliably and rapidly integrating one or more continuous variable quantities in one or more orders of integration.

It will be understood by those skilled in the art that the above-described embodiments are meant to be merely exemplary and that they are susceptible of modification and variation without departing from the spirit and scope of the invention. More particularly, it will be evident that the principles of the invention will be equally applicable to the simultaneous integration of three or more variable quantities instead of merely the two continuous variable quantities illustrated in FIG. 1, or three or more orders of integration instead of the two orders of integration illustrated by the system of FIG. 5. These types of multiple operations can be accomplished by the utilization of conventional time-division or multiplex techniques. Further, it will be apparent that many other well known types of electronic or electro-mechanical triggering and measuring devices, which function in the same manner as the illustrated components of the drawings and achieve the same results, may be substituted for the particular electronic devices illustrated in the drawings, in accordance with the invention. Accordingly, the invention is not deemed to be limited except in the manner defined by the appended claims.

I claim:

1. Apparatus for integrating a plurality of instantaneous values of a continuous variable quantity represented by a variable electric potential, comprising a source of electrical pulses, summation counter means capable of totaling the magnitude of a plurality of instantaneous values and responsive to said electrical pulses for performing an integration of the instantaneous values of said variable quantity, gating means connecting said pulse source to said counter means and adapted to control the flow of pulses therebetween, means for selectively conditioning said summation counter for positive and negative variations in the setting of said counter, and means responsive to the magnitude of said instantaneous values of said variable quantity for enabling said gating means to vary the setting of said summation counter means as a function of the magnitude of said instantaneous values of said variable quantity.

2. Apparatus for integrating a plurality of instantaneous values of a continuous variable quantity represented by a variable electric potential, comprising a source of electrical pulses, summation counter means capable of totaling the magnitude of a plurality of instantaneous values and responsive to said electrical pulses for performing an integration of the instantaneous values of said variable quantity, gating means connecting said pulse source to said counter means and adapted to control the flow of pulses therebetween, means responsive to the magnitude of said instantaneous values of said variable quantity for enabling said gating means to vary the setting of said summation counter, and means for reversing the direction of variation of the setting of said summation counter.

3. Apparatus for integrating instantaneous values of a continuous variable quantity, comprising a source of electrical pulses having a constant repetition frequency, register means responsive to said electrical pulses, primary gating means interposed between said source of electrical pulses and said register means to control the flow of pulses therebetween, means for translating the setting of said register means into a reference signal having an incrementally increasing value proportional to the setting on said register means, means for comparing an instantaneous value of said continuous variable quantity to the value of said incrementally increasing reference value, a summation counter capable of totaling a plurality of magnitudes of said continuous variable quantity, a secondary gating means connected between said source of electrical pulses and said summation counter, and means responsive to said comparing means for enabling said secondary gating means to vary the setting of said summation counter by the addition of a value proportionate to the instantaneous value of said continuous variable quantity.

4. Apparatus for integrating the instantaneous values of a continuous variable quantity, comprising a source of electrical pulses, register means responsive to said electrical pulses, primary gating means interposed between said source of electrical pulses and said register means for controlling the flow of pulses therebetween, a summation counter capable of totaling a plurality of magnitudes of said continuous variable quantity, a secondary gating means interposed between said summation counter and said source of electrical pulses for controlling the flow of pulses therebetween, means for enabling said secondary gating means when the setting of said register means reaches a predetermined value, and means for comparing a reference signal proportional to the setting of said register means with a signal representative of an instantaneous value of said variable quantity to close said secondary gating means when said reference signal is equal to said variable quantity signal.

5. Apparatus for integrating the instantaneous values of a continuous variable quantity, comprising a source of electrical pulses, register means responsive to said electrical pulses, primary gating means interposed between said source of electrical pulses and said register means for controlling the flow of pulses therebetween, a summation counter capable of totaling a plurality of magnitudes of said continuous variable quantity, a secondary gating means interposed between said summation counter and said source of electrical pulses for controlling the flow of pulses therebetween, means for comparing a reference signal proportional to the setting of said register means with a signal representative of an instantaneous value of said variable quantity to enable said secondary gating means when said reference signal is equal to said variable quantity signal, and means for closing said secondary gating means when said register setting reaches a predetermined value.

6. Apparatus for integrating the instantaneous values of a continuous variable quantity, comprising a source of electrical pulses, register means responsive to said electrical pulses, gating means interposed between said register means and said source of electrical pulses, a summation counter, means for comparing a signal representative of the setting of said register means with a signal representative of an instantaneous value of said variable quantity signal value, and means for decreasing the value of comparing means for increasing the value of the setting of said summation counter by an amount proportional to the difference between the value of said variable quantity signal and a predetermined reference value when said predetermined reference value is less than said variable quantity signal value, and means for decreasing the value of the setting of said summation counter by an amount proportional to the difference in value between said predetermined reference value and said variable quantity signal value when said predetermined reference value is greater than said variable quantity signal value.

7. Apparatus for integrating the instantaneous values of a continuous variable quantity, comprising a source of electrical pulses, register means responsive to said electrical pulses, primary gating means interposed between said register means and said source of electrical pulses for controlling the flow of pulses therebetween, a summation counter, secondary gating means interposed between said summation counter and said source of electrical pulses for controlling the flow of pulses therebetween, means for comparing a signal representative of the setting of said register means with a signal representative of an instantaneous value of said variable quantity, means responsive to said register means and said comparing means for enabling said secondary gating means to increase the value of the setting of said summation counter by an amount proportional to the difference between the value of said variable quantity signal and a predetermined reference value when said predetermined reference value is less than said variable quantity signal value, and means responsive to said register means and said comparing means for enabling said secondary gating means to decrease the value of the setting of said summation counter by an amount proportional to the difference in value between said predetermined reference value and said variable quantity signal value when said predetermined reference value is greater than said variable quantity signal value.

8. Apparatus for integrating the instantaneous values of a continuous variable quantity, comprising a source of electrical pulses, register means responsive to said electrical pulses, primary gating means interposed between said register means and said source of electrical pulses for controlling the flow of pulses therebetween, a summation counter, secondary gating means interposed between said summation counter and said source of electrical pulses for controlling the flow of pulses therebetween, means for comparing a signal representative of the setting of said register means with a signal representative of an instantaneous value of said variable quantity, means responsive to said register means for conditioning said summation counter to operate backwardly when the setting of said register means is less than a predetermined reference value and to operate forwardly when the said register setting has a value greater than said predetermined reference value, and means responsive to said comparing means for enabling said secondary gating means to vary the value of the setting of said summation counter by an amount proportional to the difference between the tinuous variable quantity, gating means connecting said pulse source to said computing means and adapted to control the flow of pulses therebetween, means for determining instantaneous values of the continuous variable quantity, means responsive to the magnitude of said instantaneous values of said variable quantity for enabling said gating means to control the flow of pulses to said computing means, thereby presenting said instantaneous values in digital form to said digital computing means.

16. Computing apparatus for performing computations involving a plurality of instantaneous values of a continuous variable quantity represented by a variable electric potential, comprising a source of electrical pulses, digital computing means responsive to said electrical pulses for performing a mathematical computation, said digital computing means being capable of totaling said plurality of instantaneous values of said continuous variable quantity gating means connecting said pulse source to said computing means and adapted to control the flow of pulses therebetween, means for determining instantaneous values of the continuous variable quantity, means responsive to the magnitude of said instantaneous values of said variable quantity for enabling said gating means to control the flow of pulses to said computing means, thereby presenting said instantaneous values in digital form to said digital computing means, and means for producing a potential that is indicative of the results of mathematical computations performed by said digital computing means in analogue form.

17. Apparatus for integrating instantaneous values of a continuous variable quantity, comprising a source of electrical pulses having a constant repetition frequency, register means responsive to said electrical pulses, primary gating means interposed between said source of electrical pulses and said register means to control the flow of pulses therebetween, means for translating the setting of said register means into a reference signal having an incrementally increasing value proportional to the setting of said register means, means for comparing an instantaneous value of said continuous variable quantity to the value of said incrementally increasing reference value, a summation counter, a secondary gating means connected between said source of electrical pulses and said summation counter, means responsive to said comparing means for enabling said secondary gating means to vary the setting of said summation counter by the addition of a value proportionate to the instantaneous value of said continuous variable quantity, and means for producing a potential that is representative of the setting of said summation counter in analogue form.

References Cited in the file of this patent

UNITED STATES PATENTS

| | | |
|---|---|---|
| 2,398,238 | McNatt | Apr. 9, 1946 |
| 2,539,623 | Heising | Jan. 30, 1951 |
| 2,568,724 | Earp et al. | Sept. 25, 1951 |
| 2,610,793 | Krause | Sept. 16, 1952 |
| 2,616,965 | Hoeppner | Nov. 4, 1952 |
| 2,631,778 | Piper | Mar. 17, 1953 |
| 2,646,926 | Young | July 28, 1953 |
| 2,672,284 | Dickinson | Mar. 16, 1954 |
| 2,680,241 | Gridley | June 1, 1954 |
| 2,700,501 | An Wang | Jan. 25, 1955 |
| 2,700,750 | Dickinson | Jan. 25, 1955 |
| 2,725,191 | Ham | Nov. 29, 1955 |
| 2,734,683 | Turk | Feb. 14, 1956 |
| 2,787,418 | MacKnight et al. | Apr. 2, 1957 |
| 2,841,328 | Steele et al. | July 1, 1958 |

FOREIGN PATENTS

| | | |
|---|---|---|
| 1,055,460 | France | Oct. 14, 1953 |

OTHER REFERENCES

"A Survey of Analog-to-Digital Converters," Burke, Proceedings of the IRE, Oct. 1953, pgs. 1455–1461.

"Multi-Channel FM/FM Telemeter Data Handling System" by Ballard, IRE-Trans. of the Prof. Group on Instrumentation, June 1953, pgs. 105–111.

Sprague-Fundamental Concepts of the Digit Differential Analyzer Method of Computation, Math. Tables and Other Aids to Computation, vol. VI, No. 37, Jan. 1952, pgs. 41 to 49.

Gordon et al.: Special-Purpose Digital Data-Processing Computers, Proc. of the Asso. of Computing Machinery, May 1952, pgs. 39–42.

UNITED STATES PATENT OFFICE
CERTIFICATION OF CORRECTION

Patent No. 3,014,659                          December 26, 1961

Arthur H. Dickinson

It is hereby certified that error appears in the above numbered patent requiring correction and that the said Letters Patent should read as corrected below.

Column 30, line 16, for "signal value, and means for decreasing the value of" read -- , means responsive to said register means and said --.

Signed and sealed this 24th day of April 1962.

(SEAL)
Attest:

ESTON G. JOHNSON
Attesting Officer

DAVID L. LADD
Commissioner of Patents